United States Patent
Yano et al.

(10) Patent No.: US 11,741,575 B2
(45) Date of Patent: Aug. 29, 2023

(54) IMAGE PROCESSING APPARATUS AND IMAGE PROCESSING METHOD

(71) Applicant: Sony Corporation, Tokyo (JP)

(72) Inventors: Koji Yano, Tokyo (JP); Tsuyoshi Kato, Tokyo (JP); Satoru Kuma, Tokyo (JP); Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 276 days.

(21) Appl. No.: 15/733,894

(22) PCT Filed: Jun. 27, 2019

(86) PCT No.: PCT/JP2019/025557
§ 371 (c)(1),
(2) Date: Dec. 1, 2020

(87) PCT Pub. No.: WO2020/012967
PCT Pub. Date: Jan. 16, 2020

(65) Prior Publication Data
US 2021/0217139 A1    Jul. 15, 2021

(30) Foreign Application Priority Data

Jul. 11, 2018   (JP) ................................ 2018-131295

(51) Int. Cl.
*G06T 5/00*   (2006.01)
*G06T 5/20*   (2006.01)

(52) U.S. Cl.
CPC ............. *G06T 5/002* (2013.01); *G06T 5/20* (2013.01); *G06T 2207/10028* (2013.01)

(58) Field of Classification Search
CPC . G06T 5/002; G06T 5/20; G06T 2207/10028; G06T 5/10; G06T 9/00;
(Continued)

(56) References Cited

U.S. PATENT DOCUMENTS 11,182,612 B2 * 11/2021 Liu ........................... G06T 7/74
11,348,284 B2 *  5/2022 Tourapis ................. H04N 19/88
(Continued)

FOREIGN PATENT DOCUMENTS

CN         107578391 A     1/2018
JP         2008-283540 A   11/2008

OTHER PUBLICATIONS

Chen, Jiawei, Cheng Zhang, and Pingbo Tang. "Geometry-based optimized point cloud compression methodology for construction and infrastructure management." Computing in Civil Engineering (2017): 377-385. (Year: 2017).*

(Continued)

*Primary Examiner* — Andrae S Allison
(74) *Attorney, Agent, or Firm* — Xsensus LLP

(57) ABSTRACT

A filter process is performed on point cloud data using a representative value of the point cloud data for each local region obtained by dividing a three-dimensional space. A two-dimensional plane image on which the point cloud data subjected to the filter process is projected is encoded, and a bitstream is generated. The present disclosure can be applied to, for example, an information processing apparatus, an image processing apparatus, electronic equipment, an information processing method, a program, or the like.

12 Claims, 29 Drawing Sheets

A

B

(58) Field of Classification Search
CPC ........ G06T 9/001; H04N 21/816; H04N 1/41; H04N 19/597; H04N 19/117; H04N 19/80; H04N 19/85

See application file for complete search history.

(56) References Cited

U.S. PATENT DOCUMENTS

| | | | |
|---|---|---|---|
| 11,361,471 B2* | 6/2022 | Mammou | G06T 9/001 |
| 11,367,224 B2* | 6/2022 | Mammou | H04N 19/597 |
| 2017/0214943 A1 | 7/2017 | Cohen | |
| 2017/0219336 A1* | 8/2017 | Kurtz | G01B 11/24 |
| 2017/0220887 A1* | 8/2017 | Fathi | G06V 20/10 |
| 2017/0347100 A1* | 11/2017 | Chou | H03M 7/3059 |
| 2017/0347120 A1* | 11/2017 | Chou | H04N 19/86 |
| 2019/0018730 A1* | 1/2019 | Charamisinau | G06F 17/16 |
| 2019/0087979 A1* | 3/2019 | Mammou | H04N 19/597 |
| 2019/0311500 A1* | 10/2019 | Mammou | G06T 9/001 |
| 2019/0313110 A1* | 10/2019 | Mammou | H04N 19/88 |

OTHER PUBLICATIONS

R. L. de Queiroz and P. A. Chou, "Compression of 3D Point Clouds Using a Region-Adaptive Hierarchical Transform," in IEEE Transactions on Image Processing, vol. 25, No. 8, pp. 3947-3956, Aug. 2016, doi: 10.1109/TIP.2016.2575005. (Year: 2016).*

Ochotta1 et al, Image-Based Surface Compression, Computer Graphics forum, vol. 27 (2008), No. 6 pp. 1647-1663 (Year: 2008).*

Zewei et al, Vehicle Recognition and Classification Method Based on Laser Scanning Point Cloud Data, The 3rd International Conference on Transportation Information and Safety, Jun. 25-Jun. 28, 2015, Wuhan, P. R. China (Year: 2015).*

ISO et al., ISO/IEC JTC 1/SC 29/WG 11 Coding of moving pictures and audio Convenorship: UNI (Italy), https://mpeg-pcc.org/wp-content/uploads/2019/11/w18892_VPCC_TMv8_AlgorithmDescription_d1.docx, 2019 (Year: 2019).*

Nakagami O.: PCC TMC2 low complexity geometry smoothing, ISO/IEC JTC1/SC29/WG11 M43501, 2018 (Year: 2018).*

Graziosi, D., et al. "An overview of ongoing point cloud compression standardization activities: Video-based (V-PCC) and geometry-based (G-PCC)."APSIPA Transactions on Signal and Information Processing 9 (2020): e13. (Year: 2020).*

Ohji Nakagami (Sony) et al: "Point cloud compression technology proposal by Sony", 120. MPEG Meeting;Oct. 23, 2017-Oct. 27, 2017;Macau; (Motion Picture Expert Group or ISO/IEC JTC1/SC29/WG11),No. m41665 Oct. 21, 2017(Oct. 21, 2017),XP030260575,Retrieved from the Internet:URL:http://phenix.int-evry.fr/mpeg/doc_end_user/documents/120_Macau/wg11/m41665-v2-m 41665.zip m41665.docx [retrieved on Oct. 21, 2017]*paragraph [04.1]paragraph [4.2.2]-paragraph[4.2.5] figures 1,3*.

Schwarz (Nokia)Setal:"Nokia's response to CfP for Point Cloud Compression(Category 2)",120.MPEG Meeting;Oct. 23, 2017-Oct. 27, 2017;Macau;(Motion Picture Expert Group or ISO/IEC JTC1/SC29/WG11 ),No. m41779 Oct. 17, 2017(Oct. 17, 2017),XP030260370,Retrieved from the Internet:URL: http://phenix.int-evry.fr/mpeg/doc_end_user/documents/120_Macau/wg11/m41779-v2-m41779.zip m41779_PCC_Nokia_CfP_response.pdf [retrieved on Oct. 17, 2017]p. 1,paragraph1p. 2,paragraph 2p. 5,3.1.1 p. 7,3.1.2p. 9,3.1.4p. 12,3.3.3figures2,5,6.

Sung-Bum Park et al:"Multiscale Representation and Compression of 3-D Point Data",IEEE Transactions on Multimedia,IEEE Service Center,US,vol. 11 ,No. 1,Jan. 1, 2009 (Jan. 1, 2009),pp. 177-183, XP011346575,ISSN:1520-9210,DOI:10.1109/TMM.2008.2008868 * p. 177, col. 2—p. 178, col. 2* figure 1 *.

International Search Report and Written Opinion dated Sep. 10, 2019, received for PCT Application No. PCT/JP2019/025557 filed on Jun. 27, 2019, 6 Pages including English Translation.

Golla et al., "Real-time Point Cloud Compression", IEEE, 2015, 6 pages.

Mekuria et al., "Design, Implementation and Evaluation of a Point Cloud Codec for Tele-Immersive Video", IEEE, pp. 1-14.

Lanyi He, et al., "Best-Effort Projection Based Attribute Compression for 3D Point Cloud", Cooperative MediaNet Innovation Center, Shanghai Jiao Tong University, Shanghai, China, Sep. 19, 2019, 7 pages.

Khaled Mammou, et al., "Video-based and Hierarchical Approaches Point Cloud Compression", Apple Inc., ISO/IEC JTC1/SC29/WG11 m41649, Macau, China, Oct. 2017, 3 pages.

Khaled Mammou, et al., "PCC Test Model Category 2 v0", 3DG, ISO/IEC JTC1/SC29/WG11 N17248, Macau, China, Oct. 2017, 11 pages.

* cited by examiner

FIG. 2

| | SPEEDING UP THREE-DIMENSIONAL FILTER PROCESS |
|---|---|
| #1 | DIVIDING THREE-DIMENSIONAL SPACE INTO LOCAL REGIONS, AND USING REPRESENTATIVE VALUE FOR EACH LOCAL REGION AS REFERENCE VALUE IN FILTER PROCESS |
| #1-1 | LOCAL REGION DIVISION TECHNIQUE |
| #1-2 | LOCAL REGION PARAMETER SETTING |
| #1-3 | SIGNAL |
| #1-4 | FILTER PROCESSING TARGET |
| #1-5 | REPRESENTATIVE VALUE DERIVATION METHOD |
| #1-6 | FILTER PROCESS ARITHMETIC OPERATION |
| #2 | PERFORMING FILTER PROCESS ONLY ON PARTIAL REGION |
| #2-1 | PARTIAL REGION: END OF Patch IN Occupancy Map |

FIG. 6

| ID | TITLE | OUTLINE | EFFECT |
|---|---|---|---|
| 1 | CUBE | THREE-DIMENSIONAL SPACE IS UNIFORMLY DIVIDED INTO N×N×N CUBE REGIONS | PROCESS IS SPEEDED UP |
| 2 | RECTANGULAR PARALLELEPIPED | THREE-DIMENSIONAL SPACE IS UNIFORMLY DIVIDED INTO M×N×L RECTANGULAR PARALLELEPIPED REGIONS | PROCESS IS SPEEDED UP, LOAD IS SMOOTHED |
| 3 | CONSTANT NUMBER OF POINTS | REGIONS ARE SET SUCH THAT NUMBER OF Points WITHIN REGION IS CONSTANT | PROCESSING BURDEN AND RESOURCE USAGE CAN BE SMOOTHED BETWEEN RESPECTIVE LOCAL REGIONS |
| 4 | ANY SHAPE AND SIZE | REGION HAVING ANY SHAPE AND SIZE IS SET AT ANY POSITION IN THREE-DIMENSIONAL SPACE | OPTIMUM Smooth PROCESS CAN BE PERFORMED FOR OBJECT HAVING COMPLEX THREE-DIMENSIONAL SHAPE |
| 5 | METHOD SELECTION | ANY ONE IS SELECTED FROM AMONG METHODS 1 TO 4 (SIGNAL OF METHOD SELECTION INFORMATION) | OPTIMUM Smooth PROCESS CAN BE PERFORMED IN DIVERSE SITUATIONS |

FIG. 7

| ID | TITLE | OUTLINE | EFFECT |
|---|---|---|---|
| 1 | PRESCRIBED BEFOREHAND | SIZE IS SET IN ADVANCE BY STANDARD ETC. | PROCESS IS SPEEDED UP |
| 2 | USER SETTING | SETTING IS MADE ACCORDING TO PointCloud AND SITUATION SIGNAL OF SETTING INFORMATION | Smooth PROCESS IS OPTIMIZED |
| 2-1 | SETTING CONTENTS 1 | REGION SIZE | |
| 2-2 | SETTING CONTENTS 2 | NUMBER OF Points | |
| 2-3 | SETTING CONTENTS 3 | SHAPE, POSITION, ETC. | |
| 2-4 | SETTING CONTENTS 4 | SELECTION OF METHOD | |

FIG. 8

| ID | TITLE | OUTLINE | EFFECT |
|---|---|---|---|
| 1 | NOT TRANSMITTED | SETTING IS MADE IN ADVANCE BY STANDARD | ENCODING EFFICIENCY IS IMPROVED LOAD IS MITIGATED |
| 2 | NOT TRANSMITTED | OPTIMUM PARAMETERS ARE DERIVED FROM OTHER INTERNAL PARAMETERS (FOR EXAMPLE, Precision) | ENCODING EFFICIENCY IS IMPROVED REGION IS OPTIMIZED |
| 3 | TRANSMITTED IN HEADER OF STREAM | PARAMETER IS FIXED IN STREAM | ENCODING EFFICIENCY IS IMPROVED LOAD IS MITIGATED |
| 4 | TRANSMITTED IN HEADER OF FRAME | PARAMETER IS VARIABLE FOR EACH FRAME | REGION IS OPTIMIZED |

FIG. 9

| ID | TITLE | OUTLINE | EFFECT |
|---|---|---|---|
| 1 | POSITION INFORMATION ON PointCloud | FILTER PROCESS IS APPLIED TO POSITION INFORMATION ON POINT | POSITIONS ARE SMOOTHED |
| 2 | ATTRIBUTE INFORMATION ON PointCloud | FILTER PROCESS IS APPLIED TO ATTRIBUTE INFORMATION ON POINT | COLORS ETC. ARE SMOOTHED |

FIG. 10

| ID | TITLE | OUTLINE | EFFECT |
|----|-------|---------|--------|
| 1 | AVERAGE | AVERAGE VALUE INSIDE REGION IS USED | HIGH-SPEED PROCESS |
| 2 | Median | Median INSIDE REGION IS USED | STABLE RESULT IS GIVEN EVEN WHEN THERE IS NOISE |

FIG. 11

| ID | TITLE | OUTLINE | EFFECT |
|---|---|---|---|
| 1 | Trilinear | COMPUTATION BY Trilinear | GOOD BALANCE BETWEEN PROCESSING SPEED AND QUALITY |
| 2 | Tricubic | COMPUTATION BY Tricubic | HIGHER QUALITY THAN Trilinear |
| 3 | Nearest Neighbor | COMPUTATION BY Nearest Neighbor | HIGHER PROCESSING SPEED THAN Trilinear |

```
averagePoints = AveragePoint(near grid)

//condition to apply Smoothing
if(is_Boundary(curPos)) {
    if(! all same patch (near grid)) {
        curPoint = trilinear(averagePoints)
    }
}
```

B

× Average of the point in the grid
○ Average of the point in the grid

A

IMAGE PROCESSING APPARATUS AND IMAGE PROCESSING METHOD

CROSS-REFERENCE TO RELATED APPLICATIONS

The present application is based on PCT filing PCT/JP2019/025557, filed Jun. 27, 2019, which claims priority to JP 2018-131295, filed Jul. 11, 2018, the entire contents of each are incorporated herein by reference.

TECHNICAL FIELD

The present disclosure relates to an image processing apparatus and an image processing method, and more particularly to an image processing apparatus and an image processing method capable of suppressing an increase in processing time of a filter process for point cloud data.

BACKGROUND ART

Conventionally, as a method for encoding 3D data representing a three-dimensional structure, such as a point cloud, there has been encoding using a voxel, such as Octree (see, for example, Non-Patent Document 1).

In recent years, as another encoding method, for example, an approach has been proposed in which the position and color information on a point cloud are separately projected onto a two-dimensional plane for each small region and encoded by an encoding method for a two-dimensional image (hereinafter, also referred to as a video-based approach) (see, for example, Non-Patent Documents 2 to 4).

In such encoding, in order to suppress a reduction in subjective image quality when the point cloud restored from the decoded two-dimensional image is imaged, a method of acquiring peripheral points by a nearest neighbor search and applying a three-dimensional smooth filter has been considered.

CITATION LIST

Non-Patent Document

Non-Patent Document 1: R. Mekuria, Student Member IEEE, K. Blom, P. Cesar., Member, IEEE, "Design, Implementation and Evaluation of a Point Cloud Codec for Tele-Immersive Video", tcsvt paper submitted february.pdf Non-Patent Document 2: Tim Golla and Reinhard Klein, "Real-time Point Cloud Compression," IEEE, 2015

Non-Patent Document 3: K. Mammou, "Video-based and Hierarchical Approaches Point Cloud Compression", MPEG m41649, October 2017

Non-Patent Document 4: K. Mammou, "PCC Test Model Category 2 v0", N17248 MPEG output document, October 2017

SUMMARY OF THE INVENTION

Problems to be Solved by the Invention

However, in general, the point cloud contains a large number of points, and the processing load for the nearest neighbor search has become extremely heavy. For this reason, there has been a possibility that this method would increase the processing time.

The present disclosure has been made in view of such a situation, and it is an object of the present disclosure to enable to perform a filter process for point cloud data at a higher speed than the conventional methods, and to suppress an increase in processing time.

Solutions to Problems

An image processing apparatus on one aspect of the present technology is an image processing apparatus including: a filter processing unit that performs a filter process on point cloud data using a representative value of the point cloud data for each local region obtained by dividing a three-dimensional space; and an encoding unit that encodes a two-dimensional plane image on which the point cloud data subjected to the filter process by the filter processing unit is projected, and generates a bitstream.

An image processing method on one aspect of the present technology is an image processing method including: performing a filter process on point cloud data using a representative value of the point cloud data for each local region obtained by dividing a three-dimensional space; and encoding a two-dimensional plane image on which the point cloud data subjected to the filter process is projected, and generating a bitstream.

An image processing apparatus on another aspect of the present technology is an image processing apparatus including: a decoding unit that decodes a bitstream and generates coded data of a two-dimensional plane image on which point cloud data is projected; and a filter processing unit that performs a filter process on the point cloud data restored from the two-dimensional plane image generated by the decoding unit, using a representative value of the point cloud data for each local region obtained by dividing a three-dimensional space.

An image processing method on another aspect of the present technology is an image processing method including: decoding a bitstream and generating coded data of a two-dimensional plane image on which point cloud data is projected; and performing a filter process on the point cloud data restored from the generated two-dimensional plane image, using a representative value of the point cloud data for each local region obtained by dividing a three-dimensional space.

An image processing apparatus on still another aspect of the present technology is an image processing apparatus including: a filter processing unit that performs a filter process on some points of point cloud data; and an encoding unit that encodes a two-dimensional plane image on which the point cloud data subjected to the filter process by the filter processing unit is projected, and generates a bitstream.

An image processing method on still another aspect of the present technology is an image processing method including: performing a filter process on some points of point cloud data; and encoding a two-dimensional plane image on which the point cloud data subjected to the filter process is projected, and generating a bitstream.

An image processing apparatus on still another aspect of the present technology is an image processing apparatus including: a decoding unit that decodes a bitstream and generates coded data of a two-dimensional plane image on which point cloud data is projected; and a filter processing unit that performs a filter process on some points of the point cloud data restored from the two-dimensional plane image generated by the decoding unit.

An image processing method on still another aspect of the present technology is an image processing method including: decoding a bitstream and generating coded data of a two-dimensional plane image on which point cloud data is projected; and performing a filter process on some points of the point cloud data restored from the generated two-dimensional plane image.

In the image processing apparatus and the image processing method on one aspect of the present technology, a filter process is performed on point cloud data using a representative value of the point cloud data for each local region obtained by dividing a three-dimensional space, and a two-dimensional plane image on which the point cloud data subjected to the filter process is projected is encoded, and a bitstream is generated.

In the image processing apparatus and the image processing method on another aspect of the present technology, a bitstream is decoded and coded data of a two-dimensional plane image on which point cloud data is projected is generated, and a filter process is performed on the point cloud data restored from the generated two-dimensional plane image, using a representative value of the point cloud data for each local region obtained by dividing a three-dimensional space.

In the image processing apparatus and the image processing method on still another aspect of the present technology, a filter process is performed on some points of point cloud data, and a two-dimensional plane image on which the point cloud data subjected to the filter process is projected is encoded, and a bitstream is generated.

In the image processing apparatus and the image processing method on still another aspect of the present technology, a bitstream is decoded and coded data of a two-dimensional plane image on which point cloud data is projected is generated, and a filter process is performed on some points of the point cloud data restored from the generated two-dimensional plane image.

Effects of the Invention

According to the present disclosure, an image can be processed. In particular, an increase in processing time of a filter process for point cloud data can be suppressed.

BRIEF DESCRIPTION OF DRAWINGS

FIG. 2 is a diagram summarizing the main features relating to the present technology.

FIG. 6 is a diagram explaining an example of local region division techniques.

FIG. 7 is a diagram explaining parameters relating to the local region.

FIG. 8 is a diagram explaining transmission of information.

FIG. 9 is a diagram explaining targets of the filter process.

FIG. 10 is a diagram explaining methods of deriving a representative value.

FIG. 11 is a diagram explaining arithmetic operations of the filtering process.

MODE FOR CARRYING OUT THE INVENTION

Figure 1:
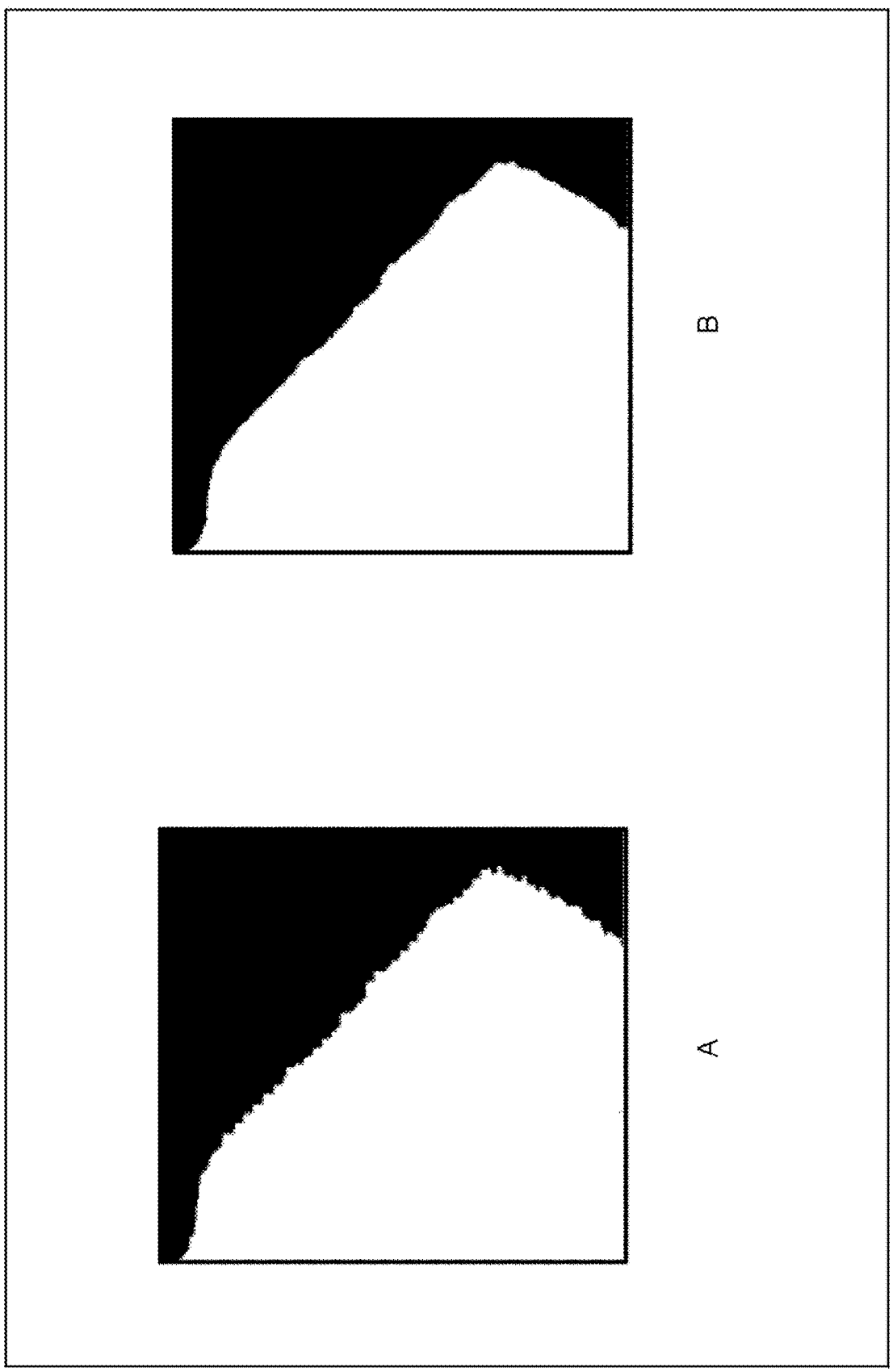
FIG. 1 is a diagram explaining an example of a smooth process.

Modes for carrying out the present disclosure (hereinafter, referred to as embodiments) will be described below. Note that the description will be given in the following order.
1. Speeding Up Filter Process
2. First Embodiment (Encoding Apparatus)
3. Second Embodiment (Decoding Apparatus)
4. Variations
5. Supplementary Notes
<1. Speeding Up Filter Process>
<Documents etc. that Support Technological Contents and Terms>

The scope disclosed in the present technology includes not only the contents described in the embodiments but also the contents described in the following non-patent documents known at the time of filing.

Non-Patent Document 1: (described above)
Non-Patent Document 2: (described above)
Non-Patent Document 3: (described above)
Non-Patent Document 4: (described above)
Non-Patent Document 5: TELECOMMUNICATION STANDARDIZATION SECTOR OF ITU (International Telecommunication Union), "Advanced video coding for generic audiovisual services", H.264, April 2017
Non-Patent Document 6: TELECOMMUNICATION STANDARDIZATION SECTOR OF ITU (International Telecommunication Union), "High efficiency video coding", H.265, December 2016

Non-Patent Document 7: Jianle Chen, Elena Alshina, Gary J. Sullivan, Jens-Rainer, Jill Boyce, "Algorithm Description of Joint Exploration Test Model 4", JVET-G1001_v1, Joint Video Exploration Team (JVET) of ITU-T SG 16 WP 3 and ISO/IEC JTC 1/SC 29/WG 11 7th Meeting: Torino, IT, 13-21 Jul. 2017

In other words, the contents described in the above-mentioned Non-Patent Documents are also the basis for examining the support requirements. For example, even when the quad-tree block structure described in Non-Patent Document 6 and the quad tree plus binary tree (QTBT) block structure described in Non-Patent Document 7 are not directly described in the embodiments, these technologies are construed to be within the scope of disclosure of the present technology and to meet the support requirements of the claims. Furthermore, similarly, for example, technological terms such as parsing, syntax, and semantics are also construed to be within the scope of disclosure of the present technology and to meet the support requirements of the claims even when there is no direct description in the embodiments.

<Point Cloud>

Conventionally, there are data such as a point cloud representing a three-dimensional structure by point cloud position information or attribute information or the like, and a mesh that is constituted by vertices, edges, and faces, and defines a three-dimensional shape using a polygonal representation.

For example, in the case of the point cloud, a steric structure is expressed as a collection (point cloud) of a large number of points. In other words, data of the point cloud is constituted by position information and attribute information (for example, color) on each point in this point cloud. Accordingly, the data structure is relatively simple, and any steric structure can be represented with sufficient accuracy by using a sufficiently large number of points.

<Outline of Video-Based Approach>

A video-based approach in which the position and color information on such a point cloud are separately projected onto a two-dimensional plane for each small region and encoded by an encoding method for a two-dimensional image has been proposed.

In this video-based approach, the input point cloud is divided into a plurality of segmentations (also referred to as regions), and each region is projected onto a two-dimensional plane. Note that the data of the point cloud for each position (that is, the data of each point) is constituted by position information (geometry (also referred to as depth)) and attribute information (texture) as described above, and the position information and the attribute information are projected separately onto a two-dimensional plane for each region.

Then, each of these segmentations (also referred to as patches) projected on the two-dimensional plane is arranged on a two-dimensional image, and is encoded by an encoding technique for a two-dimensional plane image, such as advanced video coding (AVC) or high efficiency video coding (HEVC), for example.

<Occupancy Map>

When 3D data is projected onto a two-dimensional plane using the video-based approach, in addition to a two-dimensional plane image (also referred to as a geometry image) on which the position information is projected and a two-dimensional plane image (also referred to as a texture image) on which the attribute information is projected as described above, an occupancy map is generated. The occupancy map is map information indicating the presence or absence of the position information and the attribute information at each position on the two-dimensional plane. More specifically, in the occupancy map, the presence or absence of the position information and the attribute information is indicated for each region referred to as a precision.

Since the point cloud (each point of the point cloud) is restored in units of blocks defined by this precision of the occupancy map, the larger the size of this block, the coarser the resolution of the points. Therefore, there has been a possibility that the subjective image quality when the point cloud encoded and decoded by the video-based approach is imaged would be reduced due to the large size of this precision.

For example, when a point cloud encoded and decoded by the video-based approach is imaged, when the size of the precision is large, fine notches like saw teeth are formed at the boundary between a white portion and a black portion, as illustrated in A of FIG. 1, and there has been a possibility that the subjective image quality would be reduced.

Thus, a method has been considered in which points around a point to be processed are acquired by the nearest neighbor search (also referred to as nearest neighbor (NN)), and a three-dimensional smooth filter is applied to the point to be processed using the acquired points. By applying such a three-dimensional smooth filter, as illustrated in B of FIG. 1, the notches at the boundary between a white portion and a black portion are suppressed and a smooth linear shape is obtained, such that a reduction in subjective image quality can be suppressed.

However, in general, the point cloud contains a large number of points, and the processing load for the nearest neighbor search has become extremely heavy. For this reason, there has been a possibility that this method would increase the processing time.

Due to this increase in processing time, for example, it has been difficult to perform the video-based approach as described above immediately (in real time) (for example, to encode a moving image of 60 frames per second).

As a general scheme for speeding up NN, a method of searching by approximation (approximate NN), a method of using hardware capable of higher-speed processing, and the like are considered, but even if these methods are used, the immediate process has been practically difficult.

<Speeding Up Three-Dimensional Filter Process>

<#1. Speeding Up using Representative Value for Each Local Region>

Thus, the three-dimensional smooth filter process is speeded up. For example, as illustrated in the section of #1 in FIG. 2, a three-dimensional space is divided into local regions, a representative value of the point cloud is worked out for each local region, and the representative value for each local region is used as a reference value in the filter process.

Figure 3:
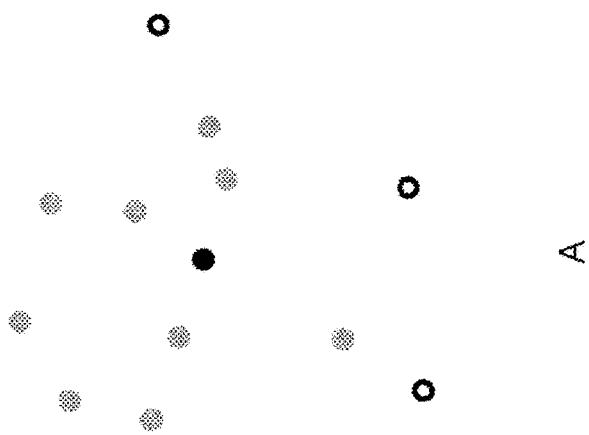
FIG. 3 is a diagram explaining a nearest neighbor search.

For example, when points are distributed as illustrated in A of FIG. 3 and a three-dimensional smooth filter is applied to the black point (curPoint) in the center, smoothing is performed by referring to (using as a reference value) the data of the gray points (nearPoint) around the black point.

The pseudo code of the conventional method is illustrated in B of FIG. 3. In the conventional case, the peripheral points (nearPoint) of the processing target point (curPoint) are resolved using the nearest neighbor search (NN) (nearPoint=NN(curPoint)), and when all the peripheral points do not belong to the same patch as each other (if(! all same patch(nearPoints))), that is, when the processing target point is located at an end portion of the patch, the processing target point is smoothed using the average of the data of the peripheral points (curPoint=average(nearPoints))).

Figure 4:
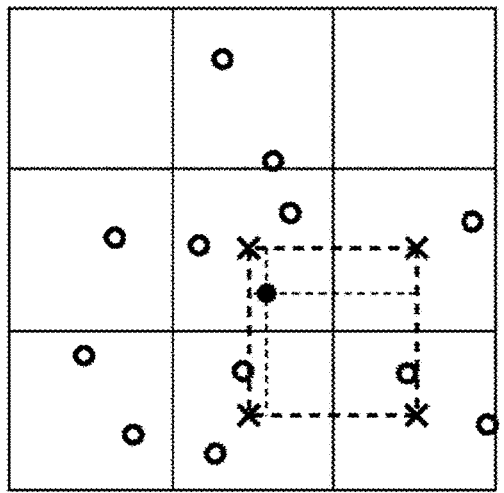
FIG. 4 is a diagram explaining an example of an outline of a filter process using the present technology.

In contrast to this, as indicated by the quadrangles in A of FIG. 4, the three-dimensional space is divided into local regions, representative values (x) of the point cloud are derived for each local region, and the processing target point (black point) is smoothed using the derived representative values. The pseudo code of this procedure is illustrated in B of FIG. 4. In this case, first, an average (Average Point) of points in the local region is derived as a representative value for each local region (grid). Then, a peripheral grid (near grid) located around a grid to which the processing target point belongs (processing target grid) is specified.

As the peripheral grid, a grid having a predetermined positional relationship established in advance with respect to the processing target grid is selected. For example, a grid adjacent to the processing target grid may be employed as a peripheral grid. For example, in the case of A of FIG. 4, when the square at the center is assumed as the processing target grid, the eight grids surrounding the processing target grid are employed as the peripheral grids.

Then, when all the peripheral points do not belong to the same patch as each other (if(! all same patch(nearPoints))), that is, when the processing target points is located at an end portion of the patch, a three-dimensional smooth filter process (curPoint=trilinear(averagePoints)) is performed on the processing target point by trilinear filtering using a collection of the representative values of these peripheral grids (averagePoints=AveragePoint(near grid)).

Figure 5:
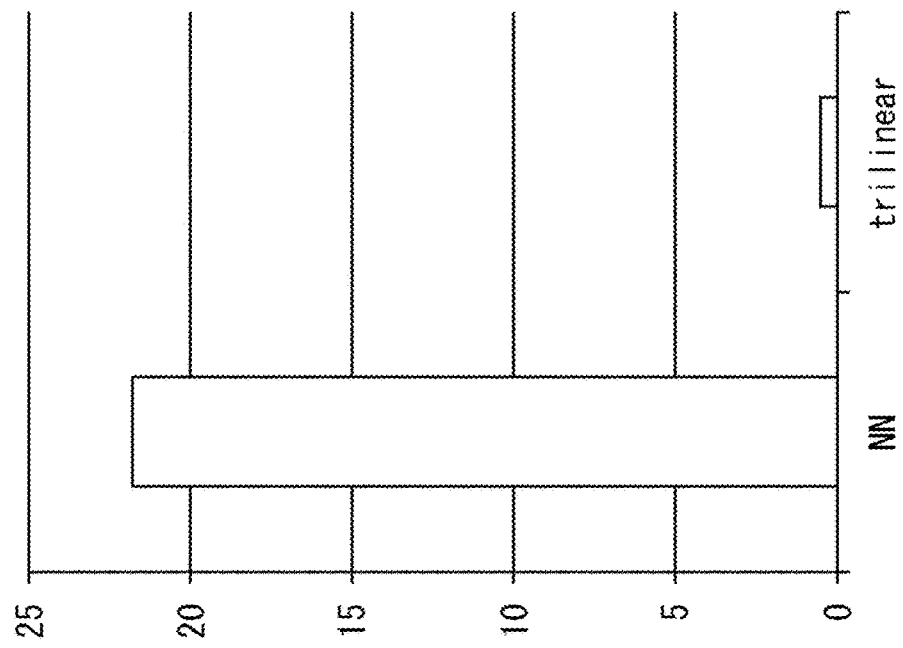
FIG. 5 is a diagram explaining an example of comparison of processing time.

By performing the process in this manner, the filter process (three-dimensional smooth filter process) can be implemented without performing the load-bearing nearest neighbor search (NN). Accordingly, a smoothing effect equivalent to that of the conventional three-dimensional smooth filter can be achieved, while the processing time of the filter process can be significantly decreased. FIG. 5 illustrates an example of comparison between the processing time of the three-dimensional smooth filter (NN) when the nearest neighbor search is used and the processing time of the three-dimensional smooth filter (trilinear) to which the present technology is applied. This demonstrates that, by applying the present technology, the processing time required as illustrated in the graph on the left side of FIG. 5 can be shortened as illustrated in the graph on the right side of FIG. 5.

Hereinafter, each section in FIG. 2 will be described with reference to FIGS. 6 to 15.

<#1-1. Local Region Division Technique>

The way of dividing the three-dimensional space (division technique for local regions) is optional. For example, the three-dimensional space may be uniformly divided into N×N×N cube regions, as in the row with "1" in the ID column of the table in FIG. 6. By dividing the three-dimensional space in this manner, the three-dimensional space can be easily divided into local regions, such that an increase in the processing time of the filter process can be suppressed (the filter process can be speeded up).

Furthermore, for example, the three-dimensional space may be uniformly divided into M×N×L rectangular parallelepiped regions, as in the row with "2" in the ID column of the table in FIG. 6. By dividing the three-dimensional space in this manner, the three-dimensional space can be easily divided into local regions, such that an increase in the processing time of the filter process can be suppressed (the filter process can be speeded up). In addition, since the degree of freedom in the shape of the local region is improved as compared with the case of dividing the three-dimensional space into the cube regions, the processing load can be further smoothed between respective local regions (the load imbalance can be suppressed).

Moreover, for example, the three-dimensional space may be divided such that the number of points in each local region is constant, as in the row with "3" in the ID column of the table in FIG. 6. By dividing the three-dimensional space in this manner, the processing burden and resource usage can be smoothed between respective local regions as compared with the case of dividing the three-dimensional space into the cube regions or rectangular parallelepiped regions (the load imbalance can be suppressed).

Furthermore, for example, a local region having any shape and size may be set at any position in the three-dimensional space, as in the row with "4" in the ID column of the table in FIG. 6. By setting the local region in this manner, a smooth process more suitable for a particular shape can be performed even for an object having a complex three-dimensional shape, and more smoothing is enabled than in the case of each of the above methods.

Moreover, for example, selection from among the above-described respective methods with the IDs "1" to "4" may be enabled, as in the row with "5" in the ID column of the table in FIG. 6. By enabling the selection in this manner, a more appropriate smooth process can be performed in diverse situations, and more smoothing is enabled. Note that how to make this selection (on the basis of what to select) is optional. Furthermore, information indicating which method has been selected may be transmitted from the encoding side to the decoding side (signal of method selection information).

<#1-2. Local Region Parameter Setting>

Furthermore, the method and contents of setting parameters of such a local region are optional. For example, the shape and size of the local region that divides the three-dimensional space (for example, L, M, N in FIG. 6) may have fixed values, as in the row with "1" in the ID column of the table in FIG. 7. For example, these values may be set in advance according to a standard or the like. By setting the values in this manner, setting the shape and size of the local region can be omitted, such that the filter process can be further speeded up.

Furthermore, for example, setting of the shape and size of the local region according to the point cloud and the situation may be enabled, as in the row with "2" in the ID column of the table in FIG. 7. That is, the parameters of the local region may be made variable. By employing the variable parameters in this manner, a more appropriate local region can be formed according to the situation, such that the filter process can be performed more appropriately. For example, the process can be further speeded up, an imbalance in the process can be suppressed, and more smoothing is enabled.

For example, the size of the local region (for example, L, M, N in FIG. 6) may be made variable, as in the row with "2-1" in the ID column of the table in FIG. 7. Furthermore, for example, the number of points contained in the local region may be made variable, as in the row with "2-2" in the ID column. Moreover, for example, the shape and position of the local region may be made variable, as in the row with "2-3" in the ID column. In addition, for example, a user or the like may be allowed to select the setting method for the local region, as in the row with "2-4" in the ID column. For example, a user or the like may be allowed to decide which method is selected from among the methods with the IDs "1" to "4" in the table in FIG. 6.

<#1-3. Signal>

Furthermore, information about the filter process may or may not be transmitted from the encoding side to the decoding side. For example, as in the row with "1" in the ID column of the table in FIG. 8, all parameters relating to the filter process may be set in advance by a standard or the like such that information about the filter process is not transmitted. By setting all the parameters in advance in this manner, since the amount of information to be transmitted is reduced, the encoding efficiency can be improved. In addition, since the derivation of parameters is unnecessary, the load of the filter process can be mitigated, and the filter process can be further speeded up.

Furthermore, for example, as in the row with "2" in the ID column of the table in FIG. 8, the derivation of optimum values for all parameters relating to the filter process from other internal parameters (for example, the precision of the occupancy map) may be enabled such that information about the filter process is not transmitted. By enabling the derivation of optimum values in this manner, since the amount of information to be transmitted is reduced, the encoding efficiency can be improved. In addition, it becomes possible to set a local region more suitable for the situation.

Moreover, for example, information regarding the filter process may be transmitted in the header of the bitstream, as in the row with "3" in the ID column of the table in FIG. 8. In that case, the parameter has a fixed value in the bitstream. By transmitting the information in the header of the bitstream in this manner, the amount of information to be transmitted can be relatively small, such that a reduction in encoding efficiency can be suppressed. In addition, since the parameter has a fixed value in the bitstream, it is possible to suppress an increase in the load of the filter process.

Furthermore, for example, information regarding the filter process may be transmitted in the header of the frame, as in the row with "4" in the ID column of the table in FIG. 8. In that case, the parameter can be made variable for each frame. Accordingly, it becomes possible to set a local region more suitable for the situation.

<#1-4. Filter Processing Target>

The target of the filter process is optional. For example, the position information on the point cloud may be targeted, as in the row with "1" in the ID column of the table in FIG. 9. In other words, the three-dimensional smooth filter process is performed on the position information on the processing target point. By performing the smooth filter process in this manner, smoothing of the positions between respective points of the point cloud can be implemented.

Furthermore, for example, the attribute information (color and the like) on the point cloud may be targeted, for example, as in the row with "2" in the ID column of the table in FIG. 9. In other words, the three-dimensional smooth filter process is performed on the attribute information on the processing target point. By performing the smooth filter process in this manner, smoothing of the colors and the like between respective points of the point cloud can be implemented.

<#1-5. Representative Value Derivation Method>

The method of deriving the representative value of each local region is optional. For example, as in the row with "1" in the ID column of the table in FIG. 10, the average of the data of the points inside the local region (contained in the local region) may be used as the representative value. Since the average can be calculated by an easy arithmetic operation, the representative value can be calculated at a higher speed by using the average as the representative value in this manner. That is, the filter process can be further speeded up.

Furthermore, for example, as in the row with "2" in the ID column of the table in FIG. 10, the median of the data of the points inside the local region (contained in the local region) may be used as the representative value. Since the median is less susceptible to peculiar data, a more stable result can be obtained even when there is noise. That is, a more stable filter processing result can be obtained.

As a matter of course, the method of deriving the representative value may be other than these examples. Furthermore, for example, the representative value may be derived by a plurality of methods such that a more favorable value is selected. Moreover, for example, different derivation methods may be allowed for each local region. For example, the derivation method may be selected according to the features of the three-dimensional structure represented by the point cloud. For example, the representative value may be derived by the median for a portion with a fine shape including a lot of noise, such as hair, whereas the representative value may be derived by the average for a portion with a clear boundary, such as clothes.

<#1-6. Filter Process Arithmetic Operation>

The arithmetic operation of the filter process (three-dimensional smooth filter) is optional. For example, as in the row with "1" in the ID column of the table in FIG. 11, trilinear interpolation may be used. The trilinear interpolation has a good balance between the processing speed and the quality of the processing result. Alternatively, for example, tricubic interpolation may be used, as in the row with "2" in the ID column of the table in FIG. 11. The tricubic interpolation can obtain a higher quality processing result than the processing result of the trilinear interpolation. Moreover, for example, the nearest neighbor search (NN) may be used, as in the row with "3" in the ID column of the table in FIG. 11. This method can obtain the processing result at a higher speed than the speed of the trilinear interpolation. As a matter of course, the three-dimensional smooth filter may be implemented by any arithmetic operation other than these methods.

<#2. Simplification of Three-Dimensional Filter Process>

Figure 12:
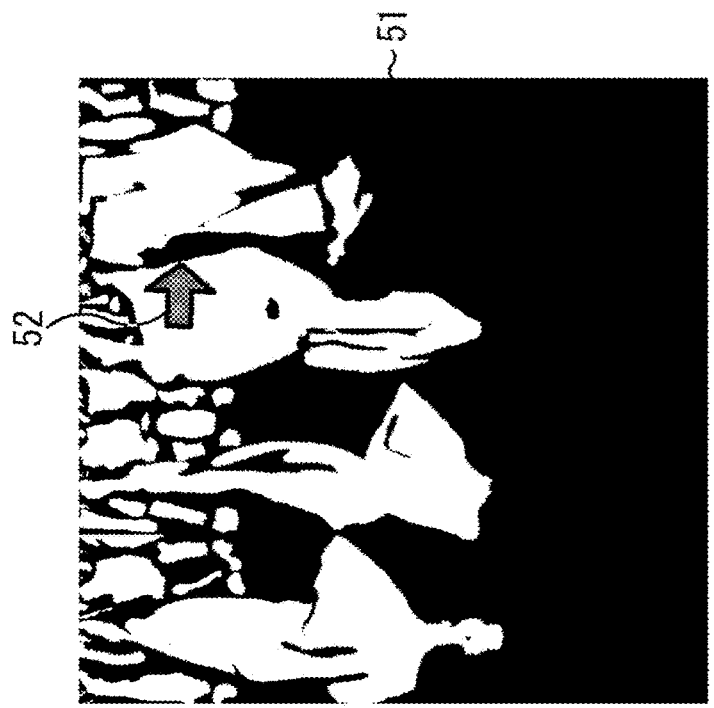
FIG. 12 is a diagram explaining a target range of the filter process.

Furthermore, as illustrated in the section of #2 in FIG. 2, the filter process may be performed exclusively in a partial region. FIG. 12 is a diagram illustrating an example of the occupancy map. In an occupancy map 51 illustrated in FIG. 12, the white portions indicate regions (precisions) having data in a geometry image in which the position information on the point cloud is projected on the two-dimensional plane and data in a texture image in which the attribute information on the point cloud is projected on the two-dimensional plane, and the black portions indicate regions having no data in the geometry image or the texture image. In other words, the white portions indicate regions where patches of the point cloud are projected, and the black portions indicate regions where patches of the point cloud are not projected.

A notch as indicated in A of FIG. 1 occurs at a boundary portion between patches, as pointed by an arrow 52 in FIG. 12. Thus, as illustrated in the section of #2-1 in FIG. 2, the three-dimensional smooth filter process may be performed only on a point corresponding to such a boundary portion between patches (an end of the patch in the occupancy map). In other words, an end portion of the patch in the occupancy map may be employed as a partial region on which the three-dimensional smooth filter process is performed.

By employing an end portion of the patch as a partial region in this manner, the three-dimensional smooth filter process can be performed only on some regions. In other words, since the region on which the three-dimensional smooth filter process is performed can be reduced, the three-dimensional smooth filter process can be further speeded up.

Figure 13:
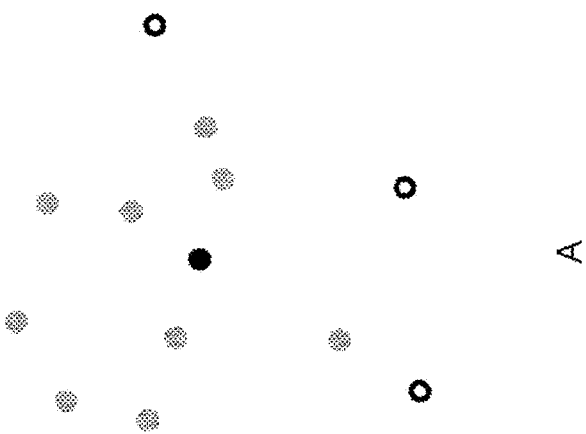
FIG. 13 is a diagram explaining a case of application to a filter process using the nearest neighbor search.

This method can be combined with a conventional nearest neighbor search as illustrated in A of FIG. 13. In other words, as in the pseudo code illustrated in B of FIG. 13, the three-dimensional smooth filter process including the nearest neighbor search (k-NearestNeighbor) may be performed only when the position of the processing target point corresponds to an end of the patch (if(is_Boundary(curPos))).

Figure 14:
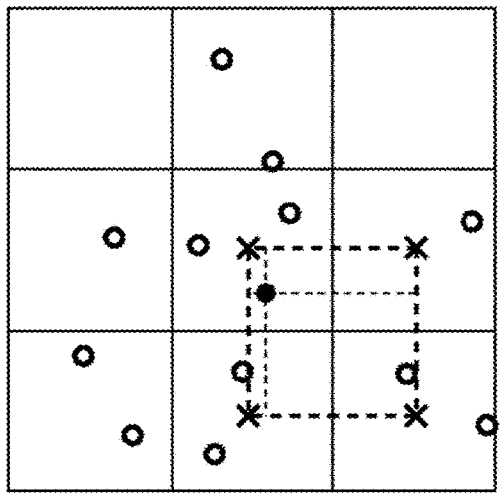
FIG. 14 is a diagram explaining a case of application to a filter process using a representative value for each local region.

Furthermore, as illustrated in A of FIG. 14, the filter process described above in #1, to which the present technology is applied, may be used in combination. In other words, as in the pseudo code illustrated in B of FIG. 14, the three-dimensional smooth filter process by the trilinear interpolation using the representative value of the local region may be performed only when the position of the processing target point corresponds to an end of the patch (if(is_Boundary(curPos))).

Figure 15:
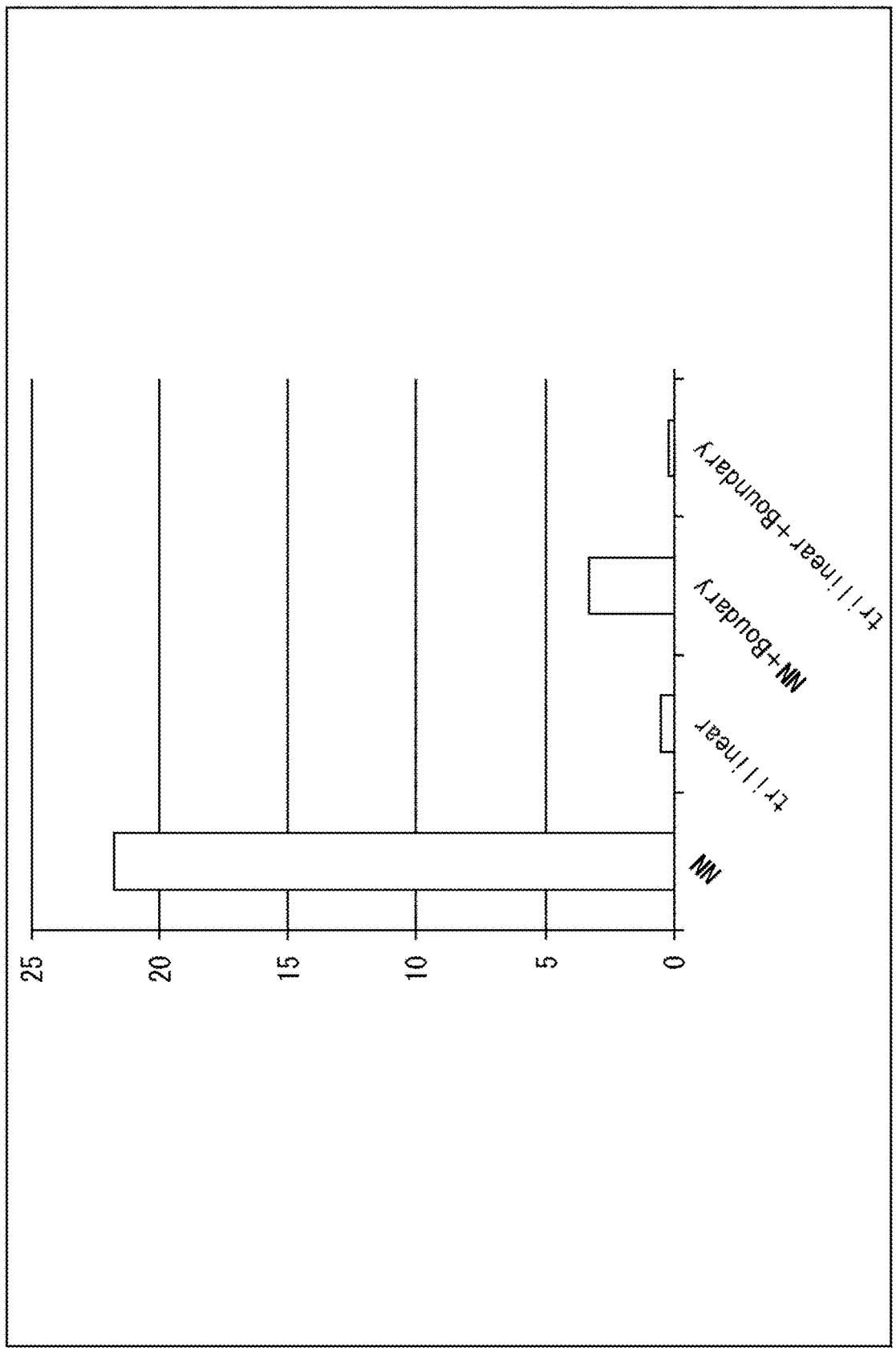
FIG. 15 is a diagram explaining an example of comparison of processing time.

FIG. 15 illustrates an example of comparison of the processing time between respective methods. The first graph from the left illustrates the processing time of the smooth filter process using the conventional nearest neighbor search. The second graph from the left illustrates the processing time of the three-dimensional smooth filter process by the trilinear interpolation using the representative value of the local region. The third graph from the left illustrates the processing time when the smooth filter process using the conventional nearest neighbor search is performed only on a point corresponding to an end portion of the patch in the occupancy map. The fourth graph from the left illustrates the processing time when the three-dimensional smooth filter process by the trilinear interpolation using the representative value of the local region is performed only on a point corresponding to an end portion of the patch in the occupancy map. In this manner, by performing the three-dimensional smooth filter only on some regions, the processing time can be reduced regardless of the method of the filter process.

2. First Embodiment

<Encoding Apparatus>

Figure 16:
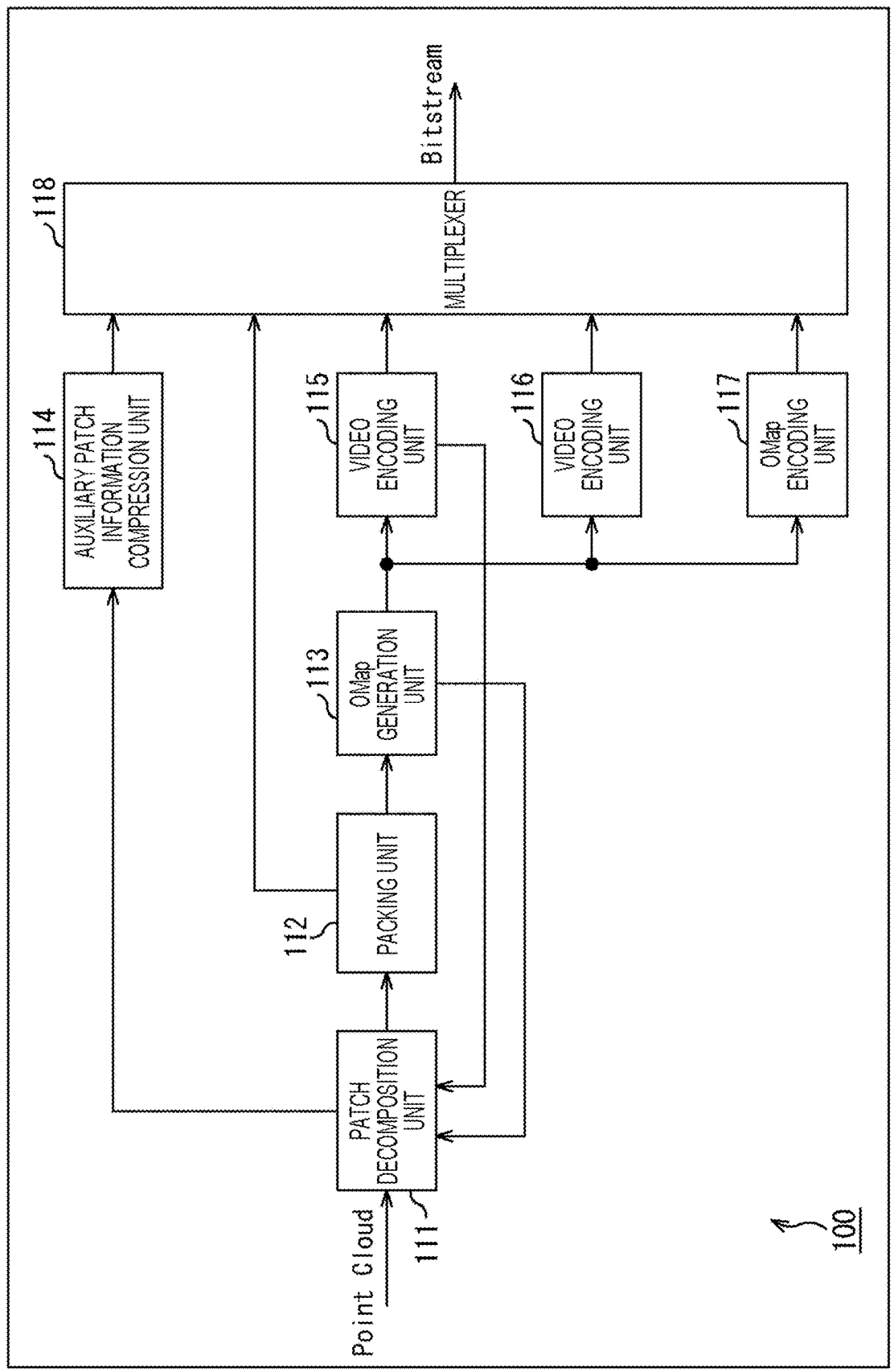
FIG. 16 is a block diagram illustrating a main configuration example of an encoding apparatus.

Next, a configuration that implements each of the schemes as mentioned above will be described. FIG. 16 is a block diagram illustrating an example of the configuration of an encoding apparatus that is an exemplary form of an image processing apparatus to which the present technology is applied. An encoding apparatus 100 illustrated in FIG. 16 is an apparatus that projects 3D data such as a point cloud onto a two-dimensional plane and encodes the projected 3D data by an encoding method for a two-dimensional image (an encoding apparatus to which the video-based approach is applied).

Note that FIG. 16 illustrates main ones of processing units, data flows, and the like, and FIG. 16 does not necessarily illustrate all of them. In other words, in the encoding apparatus 100, there may be a processing unit that is not illustrated as a block in FIG. 16, or there may be a process or data flow that is not illustrated as an arrow or the like in FIG. 16. This similarly applies also to other figures explaining the processing units and the like in the encoding apparatus 100.

As illustrated in FIG. 16, the encoding apparatus 100 includes a patch decomposition unit 111, a packing unit 112, an OMap generation unit 113, an auxiliary patch information compression unit 114, a video encoding unit 115, a video encoding unit 116, and an OMap encoding unit 117, and a multiplexer 118.

The patch decomposition unit 111 performs a process relating to the decomposition of 3D data. For example, the patch decomposition unit 111 acquires 3D data (for example, a point cloud) representing a three-dimensional structure, which has been input to the encoding apparatus 100. Furthermore, the patch decomposition unit 111 decomposes the acquired 3D data into a plurality of segmentations to project the 3D data on a two-dimensional plane for each segmentation, and generates a patch of the position information and a patch of the attribute information.

The patch decomposition unit 111 supplies information regarding each generated patch to the packing unit 112. Furthermore, the patch decomposition unit 111 supplies auxiliary patch information, which is information regarding the decomposition, to the auxiliary patch information compression unit 114.

The packing unit 112 performs a process relating to data packing. For example, the packing unit 112 acquires data (a patch) of the two-dimensional plane on which the 3D data is projected for each region, which has been supplied from the patch decomposition unit 111. Furthermore, the packing unit 112 arranges each acquired patch on a two-dimensional image, and packs the obtained two-dimensional image as a video frame. For example, the packing unit 112 separately packs, as video frames, a patch of the position information (geometry) indicating the position of a point and a patch of the attribute information (texture) such as color information added to the position information.

The packing unit 112 supplies the generated video frames to the OMap generation unit 113. Furthermore, the packing unit 112 supplies control information regarding the packing to the multiplexer 118.

The OMap generation unit 113 performs a process relating to the generation of the occupancy map. For example, the OMap generation unit 113 acquires data supplied from the packing unit 112. Furthermore, the OMap generation unit 113 generates an occupancy map corresponding to the position information and the attribute information. The OMap generation unit 113 supplies the generated occupancy map and various pieces of information acquired from the packing unit 112 to subsequent processing units. For example, the OMap generation unit 113 supplies the video frame of the position information (geometry) to the video encoding unit 115. In addition, for example, the OMap generation unit 113 supplies the video frame of the attribute information (texture) to the video encoding unit 116. Moreover, for example, the OMap generation unit 113 supplies the occupancy map to the OMap encoding unit 117.

The auxiliary patch information compression unit 114 performs a process relating to the compression of the auxiliary patch information. For example, the auxiliary patch information compression unit 114 acquires data supplied from the patch decomposition unit 111. The auxiliary patch information compression unit 114 encodes (compresses) the auxiliary patch information included in the acquired data. The auxiliary patch information compression unit 114 supplies the obtained coded data of the auxiliary patch information to the multiplexer 118.

The video encoding unit 115 performs a process relating to encoding of the video frame of the position information (geometry). For example, the video encoding unit 115 acquires the video frame of the position information (geometry) supplied from the OMap generation unit 113. Furthermore, the video encoding unit 115 encodes the acquired video frame of the position information (geometry) by any encoding method for a two-dimensional image, such as AVC or HEVC, for example. The video encoding unit 115 supplies coded data obtained by the encoding (coded data of the video frame of the position information (geometry)), to the multiplexer 118.

The video encoding unit 116 performs a process relating to encoding of the video frame of the attribute information (texture). For example, the video encoding unit 116 acquires the video frame of the attribute information (texture) supplied from the OMap generation unit 113. Furthermore, the video encoding unit 116 encodes the acquired video frame of the attribute information (texture) by any encoding method for a two-dimensional image, such as AVC or HEVC, for example. The video encoding unit 116 supplies coded data obtained by the encoding (coded data of the video frame of the attribute information (texture)), to the multiplexer 118.

The OMap encoding unit 117 performs a process relating to encoding of the occupancy map. For example, the OMap encoding unit 117 acquires the occupancy map supplied from the OMap generation unit 113. Furthermore, the OMap encoding unit 117 encodes the acquired occupancy map by any encoding method such as arithmetic coding, for example. The OMap encoding unit 117 supplies coded data obtained by the encoding (coded data of the occupancy map) to the multiplexer 118.

The multiplexer 118 performs a process relating to multiplexing. For example, the multiplexer 118 acquires the coded data of the auxiliary patch information supplied from the auxiliary patch information compression unit 114. Furthermore, the multiplexer 118 acquires the control information regarding the packing supplied from the packing unit 112. In addition, the multiplexer 118 acquires the coded data of the video frame of the position information (geometry) supplied from the video encoding unit 115. In addition, the multiplexer 118 acquires the coded data of the video frame of the attribute information (texture) supplied from the video encoding unit 116. In addition, the multiplexer 118 acquires the coded data of the occupancy map supplied from the OMap encoding unit 117.

The multiplexer 118 multiplexes the acquired pieces of information to generate a bitstream. The multiplexer 118 outputs the generated bitstream to the outside of the encoding apparatus 100.

In such an encoding apparatus 100, the patch decomposition unit 111 acquires the occupancy map generated by the OMap generation unit 113 from the OMap generation unit 113. Furthermore, the patch decomposition unit 111 acquires the coded data of the video frame of the position information (geometry) (also referred to as a geometry image) generated by the video encoding unit 115 from the video encoding unit 115.

Then, the patch decomposition unit 111 uses these pieces of data to perform the three-dimensional smooth filter process on the point cloud. In other words, the patch decomposition unit 111 projects the 3D data subjected to the three-dimensional smooth filter process onto a two-dimensional plane, and generates a patch of the position information and a patch of the attribute information.

<Patch Decomposition Unit>

Figure 17:
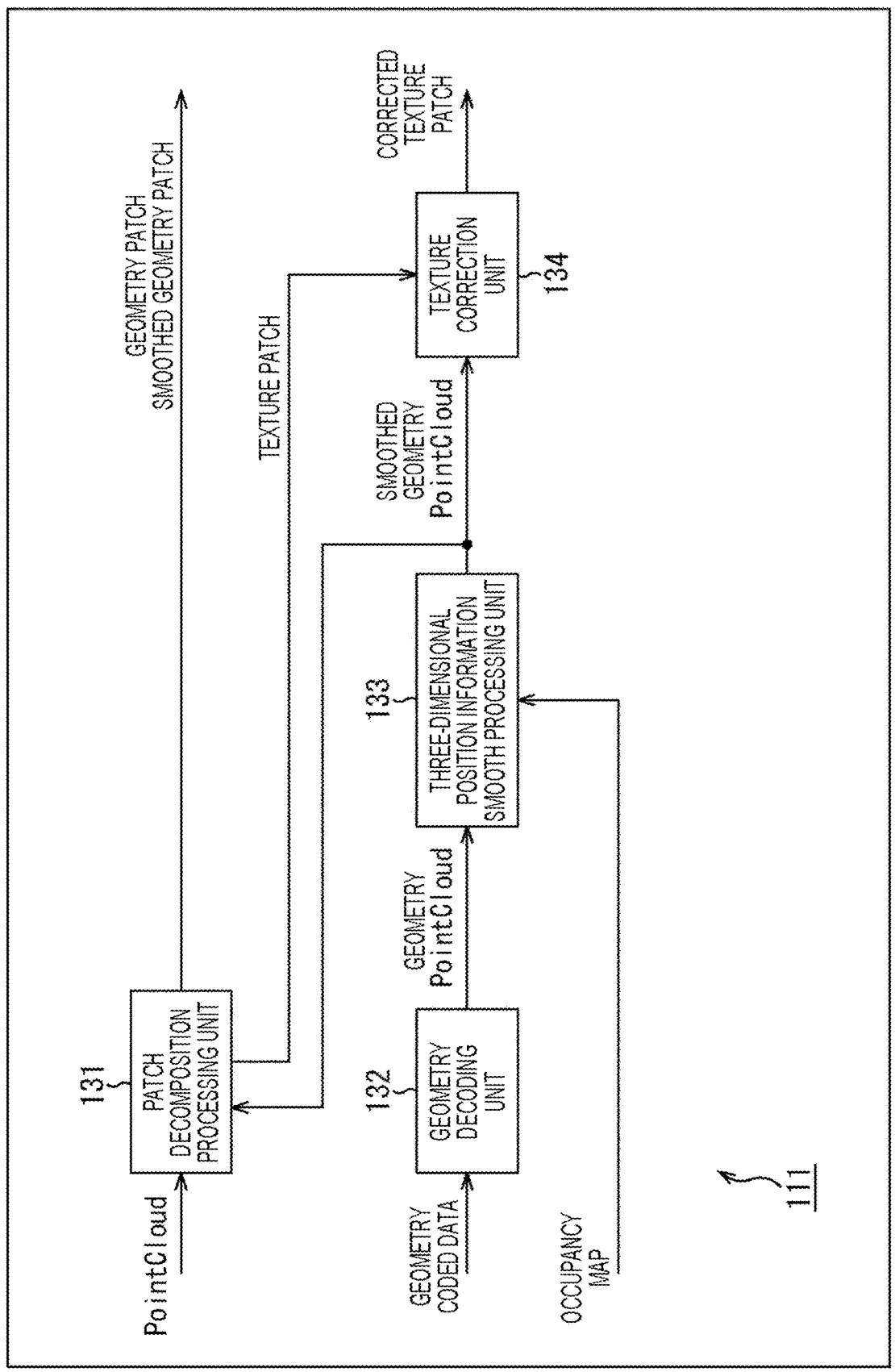
FIG. 17 is a diagram explaining a main configuration example of a patch decomposition unit.

FIG. 17 is a block diagram illustrating a main configuration example of the patch decomposition unit 111 in FIG. 16. As illustrated in FIG. 17, the patch decomposition unit 111 includes a patch decomposition processing unit 131, a geometry decoding unit 132, a three-dimensional position information smooth processing unit 133, and a texture correction unit 134.

The patch decomposition processing unit 131 acquires a point cloud to decompose the acquired point cloud into a plurality of segmentations, and projects the point cloud onto a two-dimensional plane for each segmentation to generate a patch of the position information (geometry patch) and a patch of the attribute information (texture patch). The patch decomposition processing unit 131 supplies the generated geometry patch to the packing unit 112. Furthermore, the patch decomposition processing unit 131 supplies the generated texture patch to the texture correction unit 134.

The geometry decoding unit 132 acquires the coded data of the geometry image (geometry coded data). This coded data of the geometry image has been obtained by packing the geometry patch generated by the patch decomposition processing unit 131 into a video frame in the packing unit 112 and encoding the video frame in the video encoding unit 115. The geometry decoding unit 132 decodes the geometry coded data by a decoding technique corresponding to the encoding technique of the video encoding unit 115. Moreover, the geometry decoding unit 132 reconstructs the point cloud (the position information on the point cloud) from the geometry image obtained by decoding the geometry coded data. The geometry decoding unit 132 supplies the obtained position information on the point cloud (geometry point cloud) to the three-dimensional position information smooth processing unit 133.

The three-dimensional position information smooth processing unit 133 acquires the position information on the point cloud supplied from the geometry decoding unit 132. Furthermore, the three-dimensional position information smooth processing unit 133 acquires the occupancy map. This occupancy map has been generated by the OMap generation unit 113.

The three-dimensional position information smooth processing unit 133 performs the three-dimensional smooth filter process on the position information on the point cloud (geometry point cloud). At that time, as described above, the three-dimensional position information smooth processing unit 133 performs the three-dimensional smooth filter process using the representative value for each local region obtained by dividing the three-dimensional space. In addition, the three-dimensional position information smooth processing unit 133 uses the acquired occupancy map to perform the three-dimensional smooth filter process only on a point in a partial region corresponding to an end of the patch in the acquired occupancy map. By performing the three-dimensional smooth filter process in this manner, the three-dimensional position information smooth processing unit 133 can perform the filter process at a higher speed.

The three-dimensional position information smooth processing unit 133 supplies the geometry point cloud subjected to the filter process (also referred to as a smoothed geometry point cloud) to the patch decomposition processing unit 131. The patch decomposition processing unit 131 decomposes the supplied smoothed geometry point cloud into a plurality of segmentations to project the point cloud onto a two-dimensional plane for each segmentation, and generates a patch of the position information (smoothed geometry patch) to supply the generated patch to the packing unit 112.

Furthermore, the three-dimensional position information smooth processing unit 133 also supplies the smoothed geometry point cloud to the texture correction unit 134.

The texture correction unit 134 acquires the texture patch supplied from the patch decomposition processing unit 131. In addition, the texture correction unit 134 acquires the smoothed geometry point cloud supplied from the three-dimensional position information smooth processing unit 133. The texture correction unit 134 corrects the texture patch using the acquired smoothed geometry point cloud. When the position information on the point cloud is changed due to the three-dimensional smoothing, the shape of the patch projected on the two-dimensional plane can also change. In other words, the texture correction unit 134 reflects the change in the position information on the point cloud due to the three-dimensional smoothing in the patch of the attribute information (texture patch).

The texture correction unit 134 supplies the texture patch after the correction to the packing unit 112.

The packing unit 112 packs the smoothed geometry patch and the corrected texture patch supplied from the patch decomposition unit 111 separately into video frames, and generates a video frame of the position information and a video frame of the attribute information.

<Three-Dimensional Position Information Smooth Processing Unit>

Figure 18:
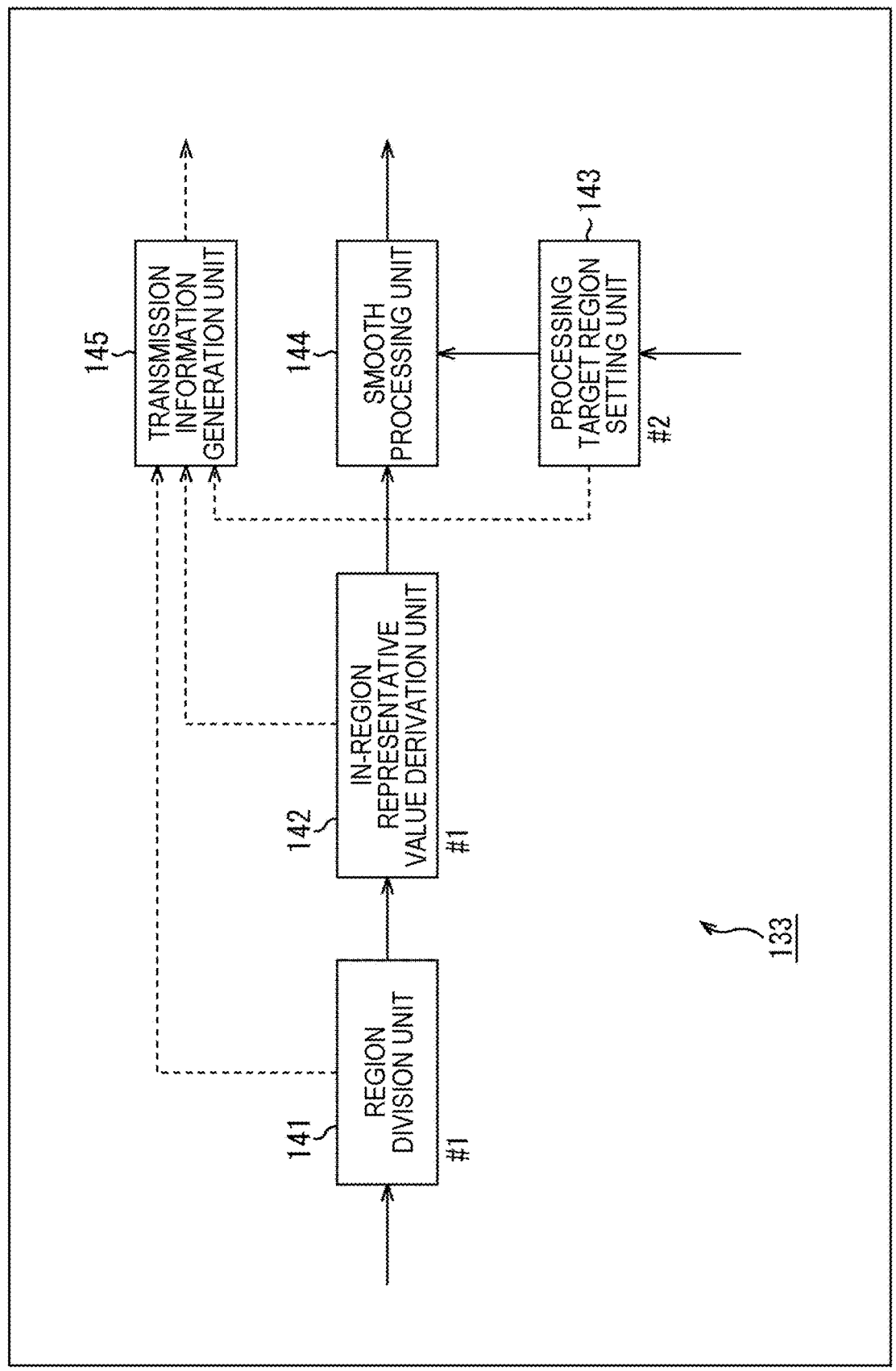
FIG. 18 is a diagram explaining a main configuration example of a three-dimensional position information smooth processing unit.

FIG. 18 is a block diagram illustrating a main configuration example of the three-dimensional position information smooth processing unit 133 in FIG. 17. As illustrated in FIG. 18, the three-dimensional position information smooth processing unit 133 includes a region division unit 141, an in-region representative value derivation unit 142, a processing target region setting unit 143, a smooth processing unit 144, and a transmission information generation unit 145.

The region division unit 141 acquires the position information on the point cloud (geometry point cloud) supplied from the geometry decoding unit 132. The region division unit 141 divides the region of the three-dimensional space including the acquired geometry point cloud, and sets a local region (grid). At that time, the region division unit 141 divides the three-dimensional space and sets the local region by the method described above in <#1. Speeding Up using Representative Value for Each Local Region>.

The region division unit 141 supplies information regarding the set local region (for example, information regarding the shape and size of the local region) and the geometry point cloud to the in-region representative value derivation unit 142. Furthermore, when information regarding the local region is to be transmitted to the decoding side, the region division unit 141 supplies the information regarding the local region to the transmission information generation unit 145.

The in-region representative value derivation unit 142 acquires the information regarding the local region and the geometry point cloud supplied from the region division unit 141. The in-region representative value derivation unit 142 derives the representative value of the geometry point cloud in each local region set by the region division unit 141, on the basis of these pieces of information. At that time, the in-region representative value derivation unit 142 derives the representative value by the method described above in <#1. Speeding Up using Representative Value for Each Local Region>.

The in-region representative value derivation unit 142 supplies the information regarding the local region, the geometry point cloud, and the representative value derived for each local region to the smooth processing unit 144. Furthermore, when the representative value derived for each local region is to be transmitted to the decoding side, information indicating the representative value for each local region is supplied to the transmission information generation unit 145.

The processing target region setting unit 143 acquires the occupancy map. The processing target region setting unit 143 sets a region to which the filter process is to be applied, on the basis of the acquired occupancy map. At that time, the processing target region setting unit 143 sets the region by the method as described above in <#2. Simplification of Three-Dimensional Filter Process>. In other words, the processing target region setting unit 143 sets a partial region corresponding to an end of the patch in the occupancy map as the processing target region for the filter process.

The processing target region setting unit 143 supplies information indicating the set processing target region to the smooth processing unit 144. Furthermore, when the information indicating the processing target region is to be transmitted to the decoding side, the processing target region setting unit 143 supplies the information indicating the processing target region to the transmission information generation unit 145.

The smooth processing unit 144 acquires the information regarding the local region, the geometry point cloud, and the representative value for each local region supplied from the in-region representative value derivation unit 142. Furthermore, the smooth processing unit 144 acquires the information indicating the processing target region, which has been supplied from the processing target region setting unit 143.

The smooth processing unit 144 performs the three-dimensional smooth filter process on the basis of these pieces of information. In other words, as described above in <Speeding Up Three-Dimensional Filter Process>, the smooth processing unit 144 performs the three-dimensional smooth filter process on a point of the geometry point cloud in the processing target region, using the representative value of each local region as a reference value. Accordingly, the smooth processing unit 144 can perform the three-dimensional smooth filter process at a higher speed.

The smooth processing unit 144 supplies the geometry point cloud subjected to the three-dimensional smooth filter process (smoothed geometry point cloud) to the patch decomposition processing unit 131 and the texture correction unit 134.

The transmission information generation unit 145 acquires the information regarding the local region supplied from the region division unit 141, the information indicating the representative value for each local region, which has been supplied from the in-region representative value derivation unit 142, and the information indicating the processing target region, which has been supplied from the processing target region setting unit 143. The transmission information generation unit 145 generates transmission information including these pieces of information. The transmission information generation unit 145 supplies the generated transmission information to, for example, the auxiliary patch information compression unit 114, and causes the auxiliary patch information compression unit 114 to transmit the supplied transmission information to the decoding side as the auxiliary patch information.

<Flow of Encoding Process>

Next, an example of the flow of an encoding process executed by the encoding apparatus 100 will be described with reference to the flowchart in FIG. 19.

Once the encoding process is started, the patch decomposition unit 111 of the encoding apparatus 100 projects a point cloud onto a two-dimensional plane, and decomposes the projected point cloud into patches in step S101.

In step S102, the auxiliary patch information compression unit 114 compresses the auxiliary patch information generated in step S101.

In step S103, the packing unit 112 packs each patch of the position information and the attribute information generated in step S101 as a video frame. Furthermore, the OMap generation unit 113 generates an occupancy map corresponding to the video frames of the position information and the attribute information.

In step S104, the video encoding unit 115 encodes a geometry video frame, which is the video frame of the position information generated in step S103, by an encoding method for a two-dimensional image.

In step S105, the video encoding unit 116 encodes a color video frame, which is the video frame of the attribute information generated in step S103, by an encoding method for a two-dimensional image.

In step S106, the OMap encoding unit 117 encodes the occupancy map generated in step S103 by a predetermined encoding method.

In step S107, the multiplexer 118 multiplexes the various pieces of information generated as described above, and generates a bitstream including these pieces of information.

In step S108, the multiplexer 118 outputs the bitstream generated in step S107 to the outside of the encoding apparatus 100.

Once the process in step S108 ends, the encoding process ends.

<Flow of Patch Decomposition Process>

Next, an example of the flow of a patch decomposition process executed in step S101 of FIG. 19 will be described with reference to the flowchart in FIG. 20.

Once the patch decomposition process is started, the patch decomposition processing unit 131 decomposes a point cloud into patches, and generates a geometry patch and a texture patch in step S121.

In step S122, the geometry decoding unit 132 decodes geometry coded data obtained by packing the geometry patch generated in step S121 into a video frame and encoding the video frame, and reconstructs the point cloud to generate a point cloud of the geometry.

In step S123, the three-dimensional position information smooth processing unit 133 executes the smooth process, and performs the three-dimensional smooth filter process on the point cloud of the geometry generated in step S122.

In step S124, the texture correction unit 134 corrects the texture patch generated in step S121, using the smoothed geometry point cloud obtained by the process in step S123.

In step S125, the patch decomposition processing unit 131 decomposes the smoothed geometry point cloud obtained by the process in step S123 into patches, and generates a smoothed geometry patch.

Figure 19:
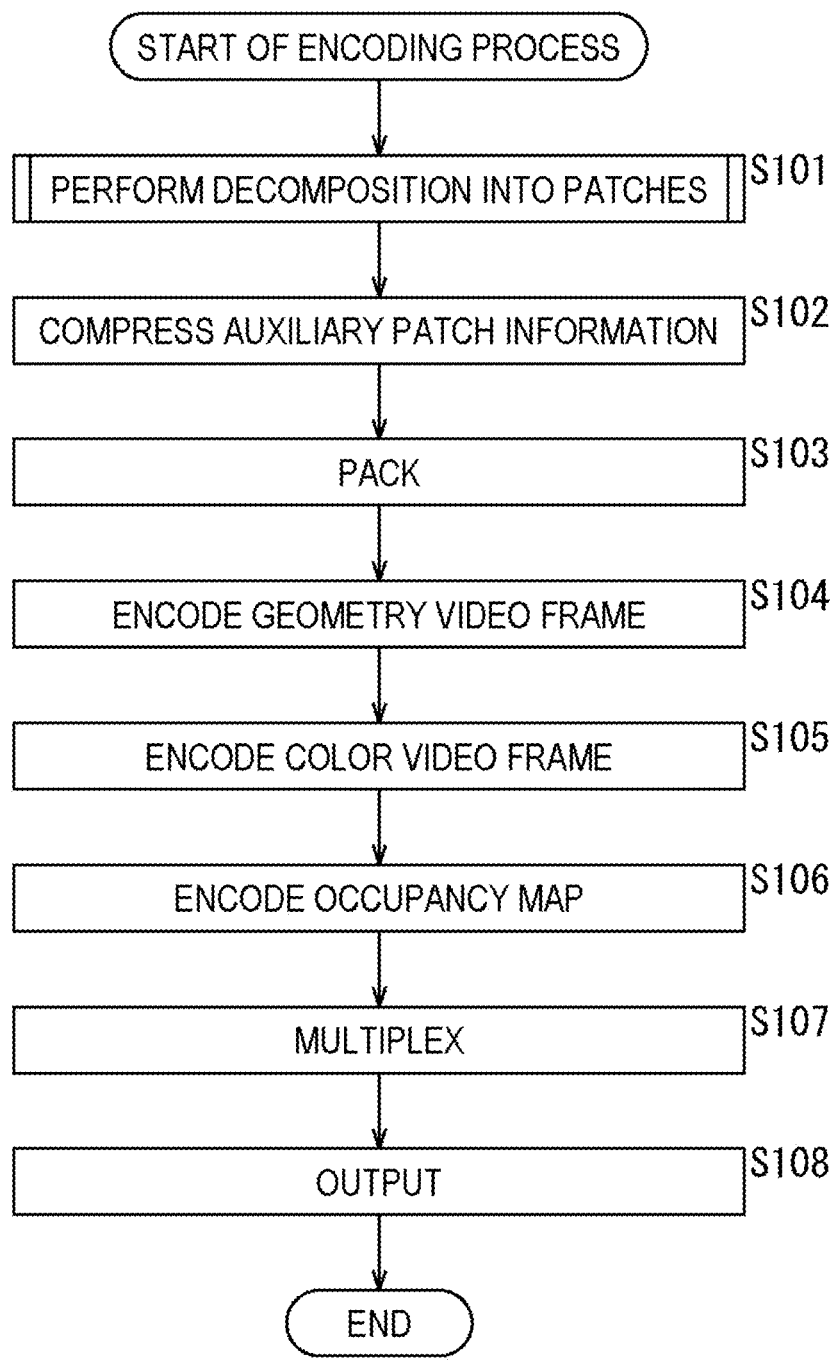
FIG. 19 is a flowchart explaining an example of the flow of an encoding process.

Once the process in step S125 ends, the patch decomposition process ends and the process returns to FIG. 19.

<Flow of Smooth Process>

Next, an example of the flow of a smooth process executed in step S123 of FIG. 20 will be described with reference to the flowchart in FIG. 21.

Once the smooth process is started, the region division unit 141 divides the three-dimensional space including the point cloud into local regions in step S141. The region division unit 141 divides the three-dimensional space and sets the local region by the method described above in <#1. Speeding Up using Representative Value for Each Local Region>.

In step S142, the in-region representative value derivation unit 142 derives the representative value of the point cloud for each local region set in step S141. The in-region representative value derivation unit 142 derives the representative value by the method described above in <#1. Speeding Up using Representative Value for Each Local Region>.

In step S143, the processing target region setting unit 143 sets a range for performing the smooth process. The processing target region setting unit 143 sets the region by the method as described above in <#2. Simplification of Three-Dimensional Filter Process>. In other words, the processing target region setting unit 143 sets a partial region corresponding to an end of the patch in the occupancy map as the processing target region for the filter process.

In step S144, the smooth processing unit 144 performs the smooth process on the processing target range set in step S143, by referring to the representative value of each region. As described above in <Speeding Up Three-Dimensional Filter Process>, the smooth processing unit 144 performs the three-dimensional smooth filter process on a point of the geometry point cloud in the processing target region, using the representative value of each local region as a reference value. Accordingly, the smooth processing unit 144 can perform the three-dimensional smooth filter process at a higher speed.

In step S145, the transmission information generation unit 145 generates transmission information regarding smoothing to supply the generated transmission information to, for example, the auxiliary patch information compression unit 114, and causes the auxiliary patch information compression unit 114 to transmit the supplied transmission information as the auxiliary patch information.

Figure 20:
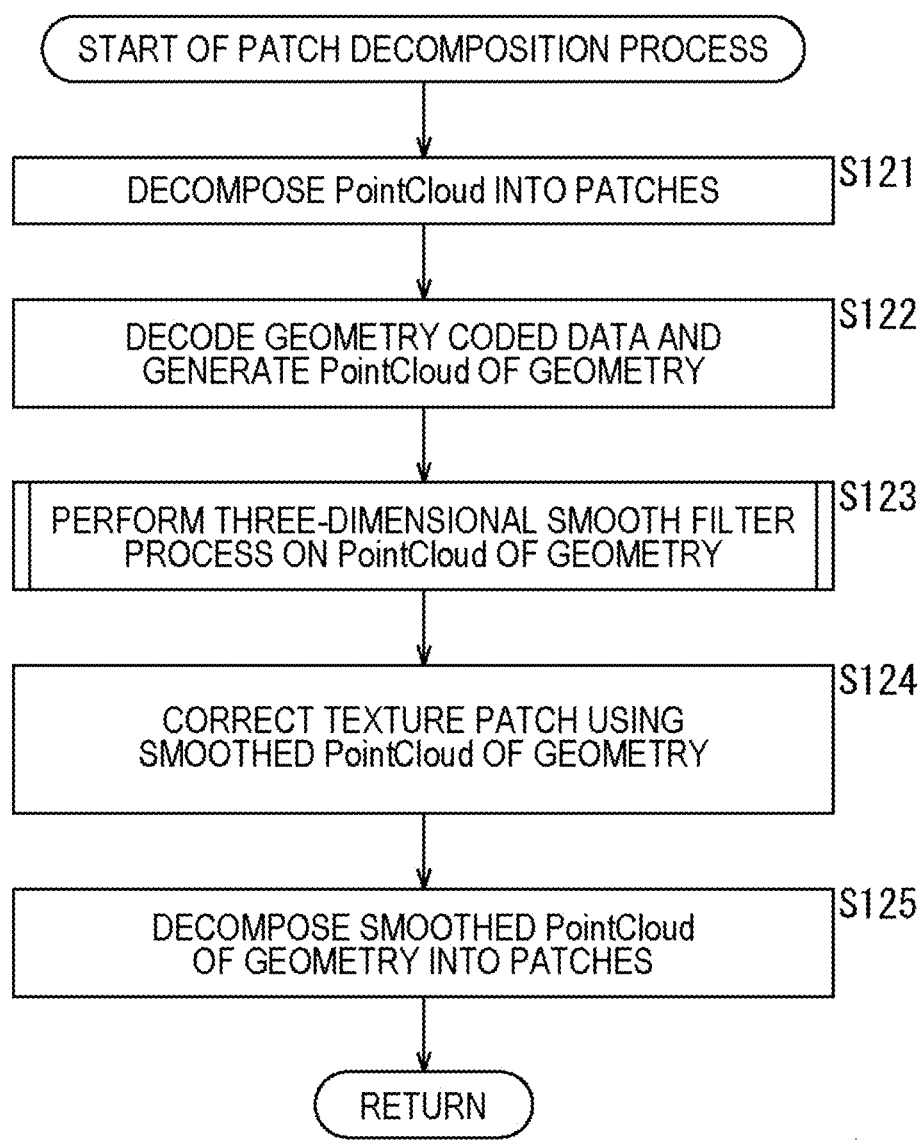
FIG. 20 is a flowchart explaining an example of the flow of a patch decomposition process.

Once the process in step S145 ends, the smooth process ends and the process returns to FIG. 20.

<Flow of Smooth Range Setting Process>

Next, an example of the flow of a smooth range setting process executed in step S143 of FIG. 21 will be described with reference to the flowchart in FIG. 22.

Once the smooth range setting process is started, the processing target region setting unit 143 determines in step S161 whether or not the current position (x, y) (processing target block) in the occupancy map is located at an end of the occupancy map. For example, when the lateral width of the occupancy map is assumed as width and the longitudinal width is assumed as height, the following determination is made.

$x!=0$ & $y!=0$ & $x!=width-1$ & $y!=height-1$

When it is determined that this determination is true, that is, the current position is not located at an end of the occupancy map, the process proceeds to step S162.

In step S162, the processing target region setting unit 143 determines whether or not all the values of peripheral portions of the current position in the occupancy map have 1. When it is determined that all the value of the peripheral portions of the current position in the occupancy map have 1, that is, all the peripheral portions have the position information and the attribute information and are not located in the vicinity of a boundary between a portion having the position information and the attribute information and a portion having no position information or attribute information, the process proceeds to step S163.

In step S163, the processing target region setting unit 143 determines whether or not all patches to which the peripheral portions of the current position belong coincide with a patch to which the current position belongs. When patches are placed side by side, portions where the value of the occupancy map has 1 continue. Accordingly, even in a case where it is determined in step S162 that all the peripheral portions of the current position have data, a portion where a plurality of patches is adjacent to each other is likely to be the case, and the current position is still likely to be located at an end of the patch. Then, since the images are basically not continuous between different patches, a notch like A in FIG. 1 is likely to be formed due to the large size of the precision of the occupancy map even in a portion where a plurality of patches is adjacent to each other. Thus, as described above, it is determined whether or not all the patches to which the peripheral portions of the current position belong coincide with a patch to which the current position belongs.

When it is determined that all the peripheral portions and the current position belong to the same patch as each other, that is, the current position is not located in a portion where a plurality of patches is adjacent to each other and not located at an end portion of the patch, the process proceeds to step S164.

In step S164, the processing target region setting unit 143 determines a three-dimensional point restored from the current position (x, y) (a point of the point cloud corresponding to the processing target block), as a point not to be subjected to the smooth filter process. In other words, the current position is excluded from the smooth processing handling range. Once the process in step S164 ends, the process proceeds to step S166.

Furthermore, when it is determined in step S161 that the above determination is false, that is, the current position is located at an end of the occupancy map, the process proceeds to step S165.

In addition, when it is determined in step S162 that there is a peripheral portion where the value of the occupancy map does not have 1, that is, there is a peripheral portion having no position information or attribute information and the current position is located at an end of the patch, the process proceeds to step S165.

Besides, when it is determined in step S163 that there is a peripheral portion belonging to a patch different from the patch to which the current position belongs, that is, the current position is located in a portion where a plurality of patches is adjacent to each other, the process proceeds to step S165.

In step S165, the processing target region setting unit 143 determines a three-dimensional point restored from the current position (x, y) (a point of the point cloud corresponding to the processing target block), as a point to be subjected to the smooth filter process. In other words, the current position is set as the smooth processing handling range. Once the process in step S165 ends, the process proceeds to step S166.

In step S166, the processing target region setting unit 143 determines whether or not all the positions (blocks) in the occupancy map have been processed. When it is determined that there is an unprocessed position (block), the process returns to step S161, and the subsequent processes are repeated for the unprocessed block allocated as the processing target block. In other words, the processes in steps S161 to S166 are repeated for each block.

Figure 21:
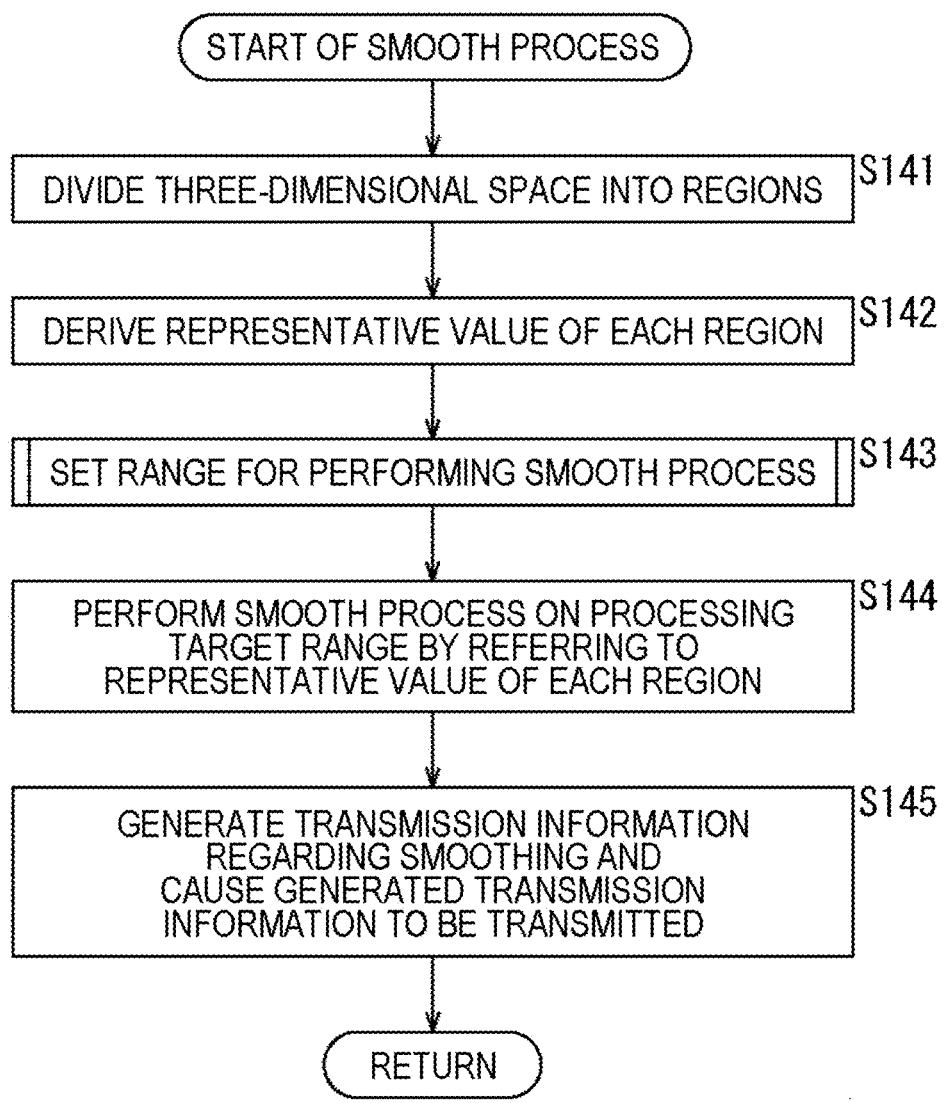
FIG. 21 is a flowchart explaining an example of the flow of a smooth process.
Figure 22:
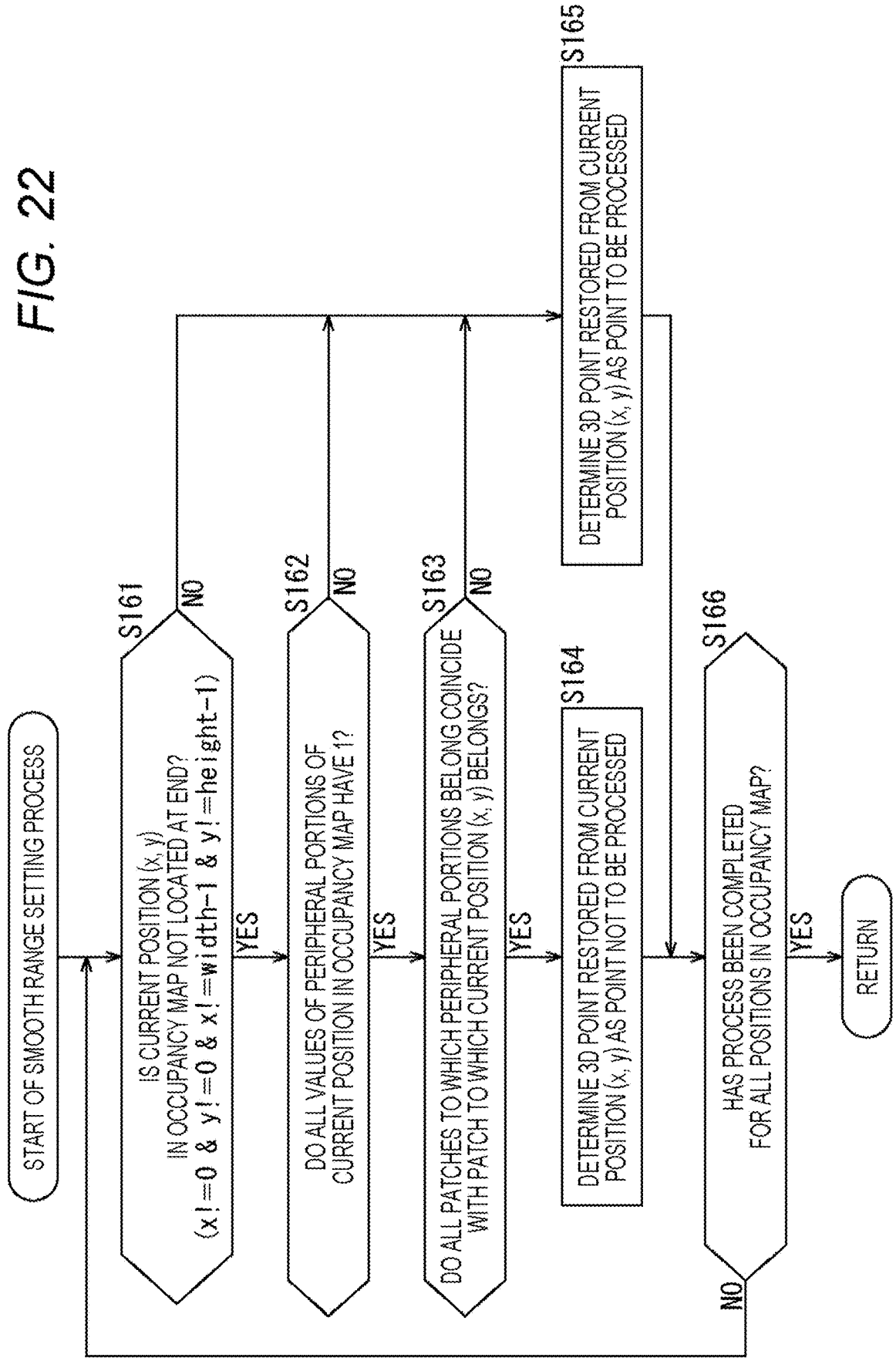
FIG. 22 is a flowchart explaining an example of the flow of a smooth range setting process.

Then, when it is determined in step S166 that all the positions (blocks) in the occupancy map have been processed, the smooth range setting process ends, and the process returns to FIG. 21.

By executing each process as described above, an increase in the processing time of the filter process for the point cloud data can be suppressed (the filter process can be performed at a higher speed).

3. Second Embodiment

<Decoding Apparatus>

Figure 23:
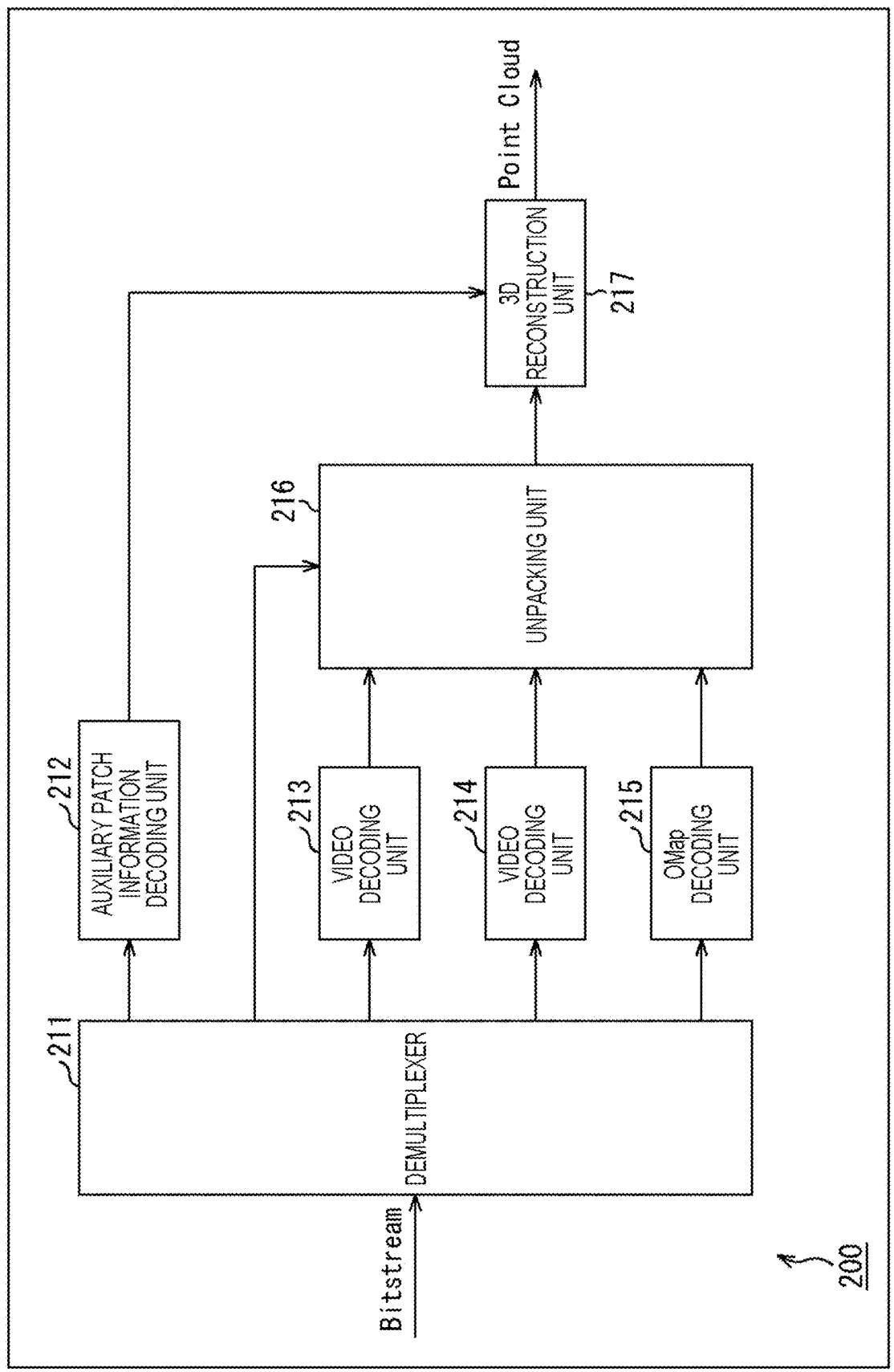
FIG. 23 is a block diagram illustrating a main configuration example of a decoding apparatus.

Next, a configuration that implements each of the schemes as mentioned above will be described. FIG. 23 is a block diagram illustrating an example of the configuration of a decoding apparatus that is an exemplary form of the image processing apparatus to which the present technology is applied. A decoding apparatus 200 illustrated in FIG. 23 is an apparatus that decodes coded data obtained by projecting 3D data such as a point cloud onto a two-dimensional plane and encoding the projected 3D data, by a decoding method for a two-dimensional image, and projects the decoded data into a three-dimensional space (a decoding apparatus to which the video-based approach is applied). For example, the decoding apparatus 200 decodes a bitstream generated by the encoding apparatus 100 (FIG. 16) encoding a point cloud, and reconstructs the point cloud.

Note that FIG. 23 illustrates main ones of processing units, data flows, and the like, and FIG. 23 does not necessarily illustrate all of them. In other words, in the decoding apparatus 200, there may be a processing unit that is not illustrated as a block in FIG. 23, or there may be a process or data flow that is not illustrated as an arrow or the like in FIG. 23. This similarly applies also to other figures explaining the processing units and the like in the decoding apparatus 200.

As illustrated in FIG. 23, the decoding apparatus 200 includes a demultiplexer 211, an auxiliary patch information decoding unit 212, a video decoding unit 213, a video decoding unit 214, an OMap decoding unit 215, an unpacking unit 216, and a 3D reconstruction unit 217.

The demultiplexer 211 performs a process relating to data demultiplexing. For example, the demultiplexer 211 acquires a bitstream input to the decoding apparatus 200. This bitstream is supplied from, for example, the encoding apparatus 100. The demultiplexer 211 demultiplexes this bitstream, and extracts the coded data of the auxiliary patch information to supply the extracted coded data to the auxiliary patch information decoding unit 212. Furthermore, the demultiplexer 211 extracts the coded data of the video frame of the position information (geometry) from the bitstream by demultiplexing, and supplies the extracted coded data to the video decoding unit 213. Moreover, the demultiplexer 211 extracts the coded data of the video frame of the attribute information (texture) from the bitstream by demultiplexing, and supplies the extracted coded data to the video decoding unit 214. In addition, the demultiplexer 211 extracts the coded data of the occupancy map from the bitstream by demultiplexing, and supplies the extracted coded data to the OMap decoding unit 215. Besides, the demultiplexer 211 extracts the control information regarding the packing from the bitstream by demultiplexing, and supplies the extracted control information to the unpacking unit 216.

The auxiliary patch information decoding unit 212 performs a process relating to decoding of the coded data of the auxiliary patch information. For example, the auxiliary patch information decoding unit 212 acquires the coded data of the auxiliary patch information supplied from the demultiplexer 211. Furthermore, the auxiliary patch information decoding unit 212 decodes (decompresses) the coded data of the auxiliary patch information included in the acquired data. The auxiliary patch information decoding unit 212 supplies the auxiliary patch information obtained by decoding to the 3D reconstruction unit 217.

The video decoding unit 213 performs a process relating to decoding of the coded data of the video frame of the position information (geometry). For example, the video decoding unit 213 acquires the coded data of the video frame of the position information (geometry) supplied from the demultiplexer 211. Furthermore, the video decoding unit 213 decodes the acquired coded data by any decoding method for a two-dimensional image, such as AVC or HEVC, for example, to obtain the video frame of the position information (geometry). The video decoding unit 213 supplies the obtained video frame of the position information (geometry) to the unpacking unit 216.

The video decoding unit 214 performs a process relating to decoding of the coded data of the video frame of the attribute information (texture). For example, the video decoding unit 214 acquires the coded data of the video frame of the attribute information (texture) supplied from the demultiplexer 211. Furthermore, the video decoding unit 214 decodes the acquired coded data by any decoding method for a two-dimensional image, such as AVC or HEVC, for example, to obtain the video frame of the attribute information (texture). The video decoding unit 214 supplies the obtained video frame of the attribute information (texture) to the unpacking unit 216.

The OMap decoding unit 215 performs a process relating to decoding of the coded data of the occupancy map. For example, the OMap decoding unit 215 acquires the coded data of the occupancy map supplied from the demultiplexer 211. Furthermore, the OMap decoding unit 215 decodes the acquired coded data by any decoding method such as arithmetic decoding corresponding to the arithmetic coding to obtain the occupancy map, for example. The OMap decoding unit 215 supplies the obtained occupancy map to the unpacking unit 216.

The unpacking unit 216 performs a process relating to unpacking. For example, the unpacking unit 216 acquires the video frame of the position information (geometry) from the video decoding unit 213, acquires the video frame of the attribute information (texture) from the video decoding unit 214, and acquires the occupancy map from the OMap decoding unit 215. Furthermore, the unpacking unit 216 unpacks the video frame of the position information (geometry) and the video frame of the attribute information (texture) on the basis of the control information regarding the packing. The unpacking unit 216 supplies, to the 3D reconstruction unit 217, data of the position information (geometry) (for example, the geometry patch), data of the attribute information (texture) (for example, the texture patch), the occupancy map, and the like obtained by unpacking.

The 3D reconstruction unit 217 performs a process relating to the reconstruction of the point cloud. For example, the 3D reconstruction unit 217 reconstructs the point cloud on the basis of the auxiliary patch information supplied from the auxiliary patch information decoding unit 212, and data of the position information (geometry) (for example, the geometry patch), data of the attribute information (texture) (for example, the texture patch), the occupancy map, and the like supplied from the unpacking unit 216. The 3D reconstruction unit 217 outputs the reconstructed point cloud to the outside of the decoding apparatus 200.

This point cloud is supplied, for example, to a display unit and imaged, and this image is displayed, recorded on a recording medium, or supplied to another apparatus via communication.

In such a decoding apparatus 200, the 3D reconstruction unit 217 performs a three-dimensional smooth filter process for the reconstructed point cloud.

<3D Reconstruction Unit>

Figure 24:
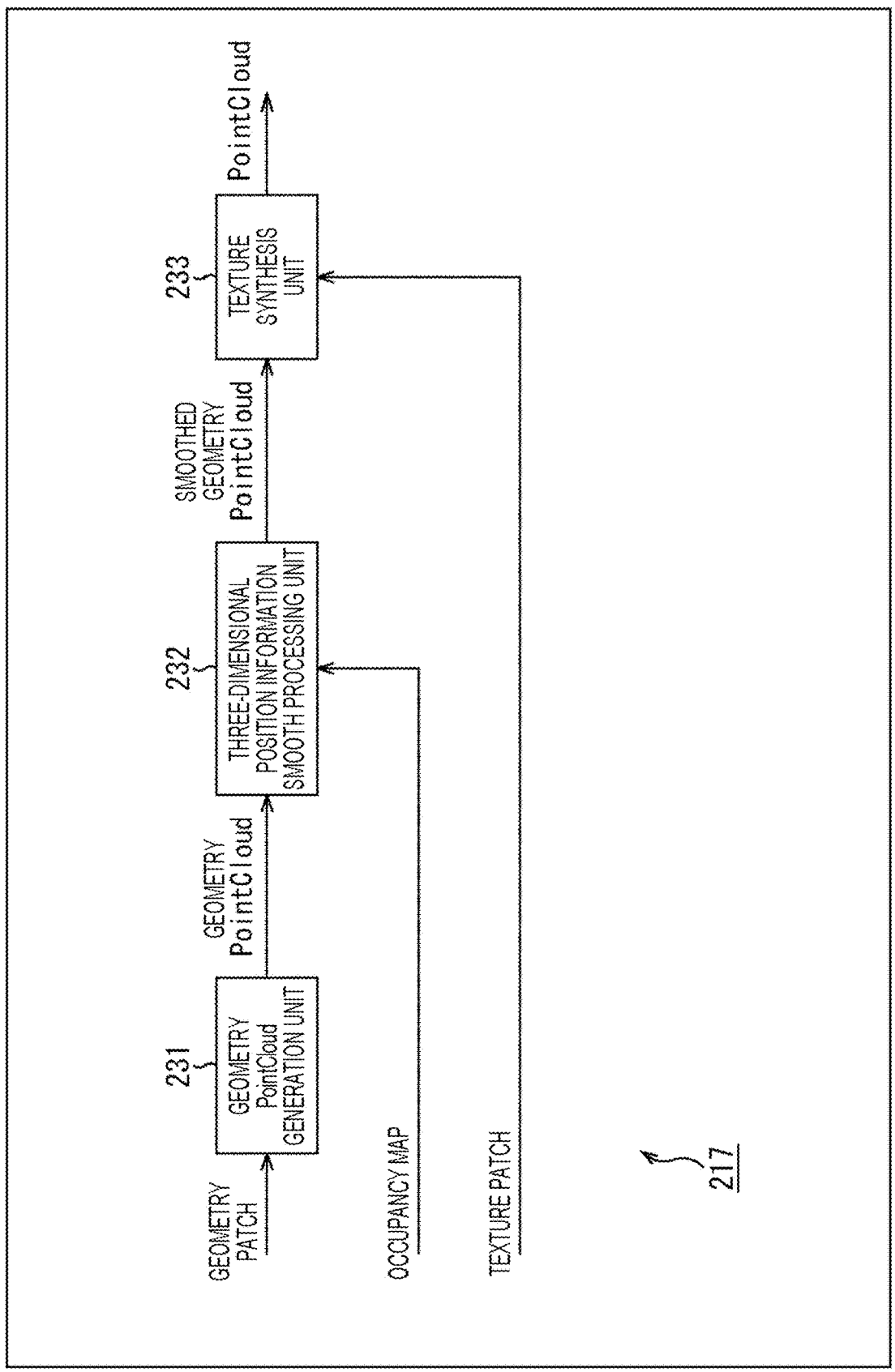
FIG. 24 is a diagram explaining a main configuration example of a 3D reconstruction unit.

FIG. 24 is a block diagram illustrating a main configuration example of the 3D reconstruction unit 217 in FIG. 23. As illustrated in FIG. 24, the 3D reconstruction unit 217 includes a geometry point cloud (PointCloud) generation unit 231, a three-dimensional position information smooth processing unit 232, and a texture synthesis unit 233.

The geometry point cloud generation unit 231 performs a process relating to the generation of the geometry point cloud. For example, the geometry point cloud generation unit 231 acquires the geometry patch supplied from the unpacking unit 216. Furthermore, the geometry point cloud generation unit 231 reconstructs the geometry point cloud (the position information on the point cloud) using the acquired geometry patch and other information such as the auxiliary patch information. The geometry point cloud generation unit 231 supplies the generated geometry point cloud to the three-dimensional position information smooth processing unit 232.

The three-dimensional position information smooth processing unit 232 performs a process relating to the three-dimensional smooth filter process. For example, the three-dimensional position information smooth processing unit 232 acquires the geometry point cloud supplied from the geometry point cloud generation unit 231. Furthermore, the three-dimensional position information smooth processing unit 232 acquires the occupancy map supplied from the unpacking unit 216.

The three-dimensional position information smooth processing unit 232 performs the three-dimensional smooth filter process on the acquired geometry point cloud. At that time, as described above, the three-dimensional position information smooth processing unit 232 performs the three-dimensional smooth filter process using the representative value for each local region obtained by dividing the three-dimensional space. In addition, the three-dimensional position information smooth processing unit 232 uses the acquired occupancy map to perform the three-dimensional smooth filter process only on a point in a partial region corresponding to an end of the patch in the acquired occupancy map. By performing the three-dimensional smooth filter process in this manner, the three-dimensional position information smooth processing unit 232 can perform the filter process at a higher speed.

The three-dimensional position information smooth processing unit 232 supplies the geometry point cloud subjected to the filter process (smoothed geometry point cloud) to the texture synthesis unit 233.

The texture synthesis unit 233 performs a process relating to geometry and texture synthesizing. For example, the texture synthesis unit 233 acquires the smoothed geometry point cloud supplied from the three-dimensional position information smooth processing unit 232. Furthermore, the texture synthesis unit 233 acquires the texture patch supplied from the unpacking unit 216. The texture synthesis unit 233 synthesizes the texture patch (that is, the attribute information) into the smoothed geometry point cloud, and reconstructs the point cloud. The position information of the smoothed geometry point cloud is changed due to three-dimensional smoothing. In other words, strictly speaking, there is likely to be a portion where the position information and the attribute information do not correspond to each other. Thus, the texture synthesis unit 233 synthesizes the attribute information obtained from the texture patch into the smoothed geometry point cloud while reflecting the change in the position information on a portion subjected to the three-dimensional smoothing.

The texture synthesis unit 233 outputs the reconstructed point cloud to the outside of the decoding apparatus 200.

<Three-Dimensional Position Information Smooth Processing Unit>

Figure 25:
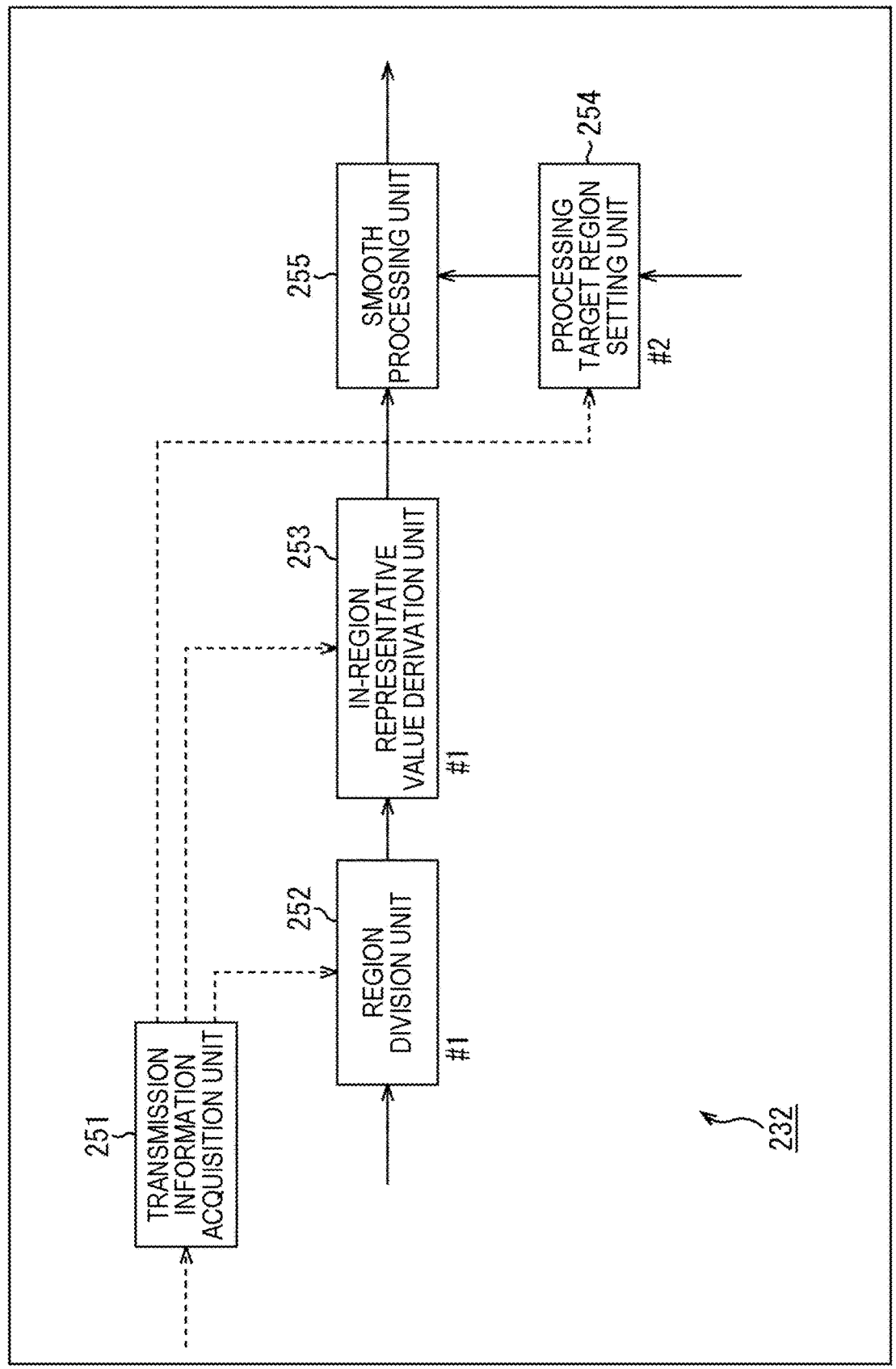
FIG. 25 is a diagram explaining a main configuration example of a three-dimensional position information smooth processing unit.

FIG. 25 is a block diagram illustrating a main configuration example of the three-dimensional position information smooth processing unit 232 in FIG. 24. As illustrated in FIG. 25, the three-dimensional position information smooth processing unit 232 includes a transmission information acquisition unit 251, a region division unit 252, an in-region representative value derivation unit 253, a processing target region setting unit 254, and a smooth processing unit 255.

When there is the transmission information transmitted from the encoding side, the transmission information acquisition unit 251 acquires the transmission information supplied as the auxiliary patch information or the like. The transmission information acquisition unit 251 supplies the acquired transmission information to the region division unit 252, the in-region representative value derivation unit 253, and the processing target region setting unit 254, as necessary. For example, when the information regarding the local region is supplied as the transmission information, the transmission information acquisition unit 251 supplies the supplied information regarding the local region to the region division unit 252. Furthermore, when the information indicating a representative value for each local region is supplied as the transmission information, the transmission information acquisition unit 251 supplies the supplied information indicating the representative value for each local region to the in-region representative value derivation unit 253. Moreover, when the information indicating the processing target region is supplied as the transmission information, the transmission information acquisition unit 251 supplies the supplied information indicating the processing target region to the processing target region setting unit 254.

The region division unit 252 acquires the position information on the point cloud (geometry point cloud) supplied from the geometry point cloud generation unit 231. The region division unit 252 divides the region of the three-dimensional space including the acquired geometry point cloud, and sets a local region (grid). At that time, the region division unit 141 divides the three-dimensional space and sets the local region by the method described above in <#1. Speeding Up using Representative Value for Each Local Region>. Note that, when the information regarding the local region transmitted from the encoding side is supplied from the transmission information acquisition unit 251, the region division unit 252 adopts the setting of the local region (for example, the shape and size of the local region) indicated by the supplied information.

The region division unit 252 supplies the information regarding the set local region (for example, information regarding the shape and size of the local region) and the geometry point cloud to the in-region representative value derivation unit 253.

The in-region representative value derivation unit 253 acquires the information regarding the local region and the geometry point cloud supplied from the region division unit 252. The in-region representative value derivation unit 253 derives the representative value of the geometry point cloud in each local region set by the region division unit 252, on the basis of these pieces of information. At that time, the in-region representative value derivation unit 253 derives the representative value by the method described above in <#1. Speeding Up using Representative Value for Each Local Region>. Note that, when the information indicating the representative value for each local region, which has been transmitted from the encoding side, is supplied from the transmission information acquisition unit 251, the in-region representative value derivation unit 253 adopts the representative value for each local region indicated by the supplied information.

The in-region representative value derivation unit 142 supplies the information regarding the local region, the geometry point cloud, and the representative value derived for each local region to the smooth processing unit 255.

The processing target region setting unit 254 acquires the occupancy map. The processing target region setting unit 254 sets a region to which the filter process is to be applied, on the basis of the acquired occupancy map. At that time, the processing target region setting unit 254 sets the region by the method as described above in <#2. Simplification of Three-Dimensional Filter Process>. In other words, the processing target region setting unit 254 sets a partial region corresponding to an end of the patch in the occupancy map as the processing target region for the filter process. Note that, when the information indicating the processing target region, which has been transmitted from the encoding side, is supplied from the transmission information acquisition unit 251, the processing target region setting unit 254 adopts the processing target region indicated by the supplied information.

The processing target region setting unit 254 supplies the information indicating the set processing target region to the smooth processing unit 255.

The smooth processing unit 255 acquires the information regarding the local region, the geometry point cloud, and the representative value for each local region supplied from the in-region representative value derivation unit 253. Furthermore, the smooth processing unit 255 acquires the information indicating the processing target region, which has been supplied from the processing target region setting unit 254.

The smooth processing unit 255 performs the three-dimensional smooth filter process on the basis of these pieces of information. In other words, as described above in <Speeding Up Three-Dimensional Filter Process>, the smooth processing unit 255 performs the three-dimensional smooth filter process on a point of the geometry point cloud in the processing target region, using the representative value of each local region as a reference value. Accordingly, the smooth processing unit 255 can perform the three-dimensional smooth filter process at a higher speed.

The smooth processing unit 255 supplies the geometry point cloud subjected to the three-dimensional smooth filter process (smoothed geometry point cloud) to the texture synthesis unit 233.

<Flow of Decoding Process>

Next, an example of the flow of a decoding process executed by the decoding apparatus 200 will be described with reference to the flowchart in FIG. 26.

Once the decoding process is started, the demultiplexer 211 of the decoding apparatus 200 demultiplexes the bitstream in step S201.

In step S202, the auxiliary patch information decoding unit 212 decodes the auxiliary patch information extracted from the bitstream in step S201.

In step S203, the video decoding unit 213 decodes the coded data of the geometry video frame (the video frame of the position information) extracted from the bitstream in step S201.

In step S204, the video decoding unit 214 decodes the coded data of the color video frame (the video frame of the attribute information) extracted from the bitstream in step S201.

In step S205, the OMap decoding unit 215 decodes the coded data of the occupancy map extracted from the bitstream in step S201.

In step S206, the unpacking unit 216 unpacks the geometry video frame obtained by decoding the coded data in step S203 to generate a geometry patch. Furthermore, the unpacking unit 216 unpacks the color video frame obtained by decoding the coded data in step S204 to generate a texture patch. Moreover, the unpacking unit 216 unpacks the occupancy map obtained by decoding the coded data in step S205 to extract the occupancy map corresponding to the geometry patch and the texture patch.

In step S207, the 3D reconstruction unit 217 reconstructs the point cloud on the basis of the auxiliary patch information obtained in step S202 and the geometry patch, texture patch, occupancy map, and the like obtained in step S206.

Once the process in step S207 ends, the decoding process ends.

<Flow of Point Cloud Reconstruction Process>

Next, an example of the flow of a point cloud reconstruction process executed in step S207 of FIG. 26 will be described with reference to the flowchart in FIG. 27.

Once the point cloud reconstruction process is started, the geometry point cloud generation unit 231 of the 3D reconstruction unit 217 reconstructs the geometry point cloud in step S221.

In step S222, the three-dimensional position information smooth processing unit 232 executes the smooth process, and performs the three-dimensional smooth filter process on the geometry point cloud generated in step S221.

In step S223, the texture synthesis unit 233 synthesizes the texture patch into the smoothed geometry point cloud.

Figure 26:
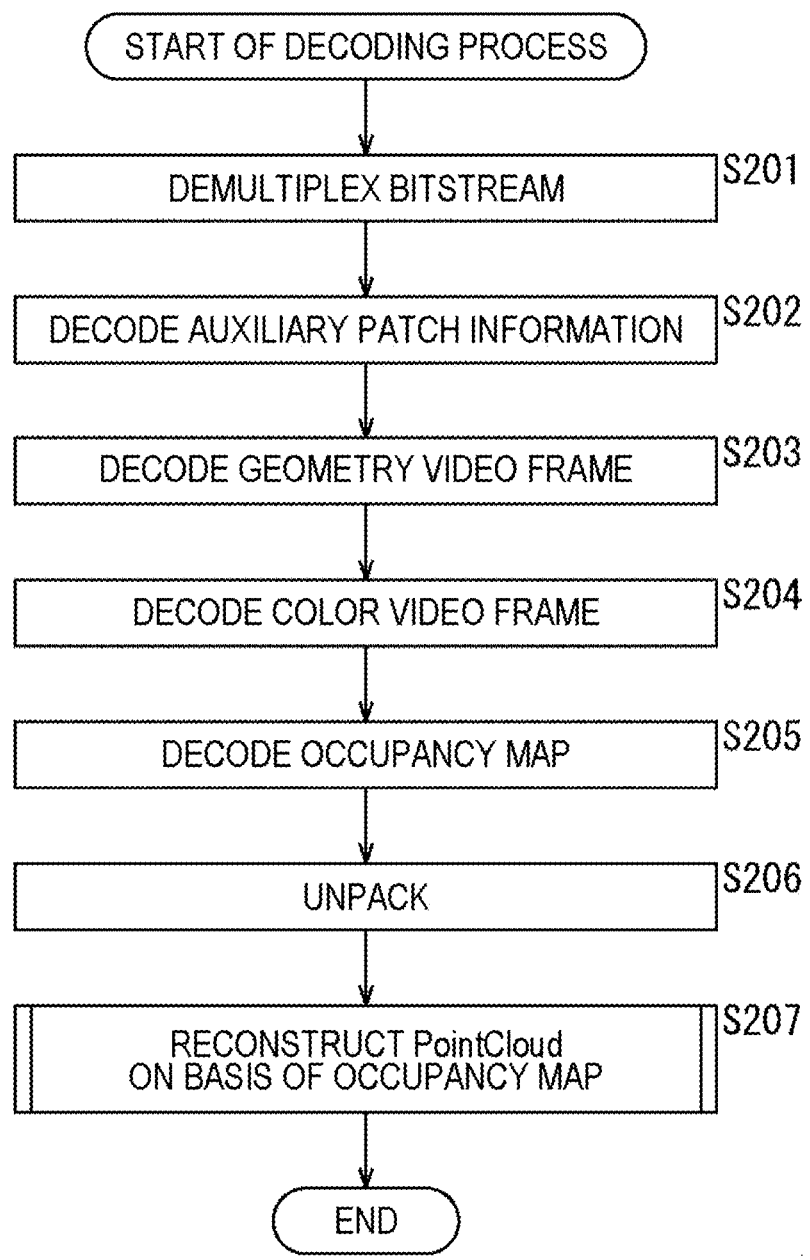
FIG. 26 is a flowchart for explaining an example of the flow of a decoding process.

Once the process in step S223 ends, the point cloud reconstruction process ends, and the process returns to FIG. 26.

<Flow of Smooth Process>

Next, an example of the flow of a smooth process executed in step S222 of FIG. 27 will be described with reference to the flowchart in FIG. 28.

Once the smooth process is started, the transmission information acquisition unit 251 acquires the transmission information regarding smoothing in step S241. Note that, when there is no transmission information, this process is omitted.

In step S242, the region division unit 252 divides the three-dimensional space including the point cloud into local regions. The region division unit 252 divides the three-dimensional space and sets the local region by the method described above in <#1. Speeding Up using Representative Value for Each Local Region>. Note that, then the information regarding the local region has been acquired as the transmission information in step S241, the region division unit 252 adopts the setting of the local region (the shape, size, and the like of the local region) indicated by the acquired information.

In step S243, the in-region representative value derivation unit 253 derives the representative value of the point cloud for each local region set in step S242. The in-region representative value derivation unit 253 derives the representative value by the method described above in <#1. Speeding Up using Representative Value for Each Local Region>. Note that, when the information indicating the representative value for each local region has been acquired as the transmission information in step S241, the in-region representative value derivation unit 253 adopts the representative value for each local region indicated by the acquired information.

In step S244, the processing target region setting unit 254 sets the range for performing the smooth process. The processing target region setting unit 254 sets the region by the method as described above in <#2. Simplification of Three-Dimensional Filter Process>. In other words, the processing target region setting unit 254 executes the smooth range setting process described with reference to the flowchart in FIG. 22, and sets the processing target range for the filter process. Note that, when the information indicating the processing target region has been acquired as the transmission information in step S241, the processing target region setting unit 254 adopts the setting of the processing target region indicated by the acquired information.

In step S245, the smooth processing unit 255 performs the smooth process on the processing target range set in step S244, by referring to the representative value of each region. As described above in <Speeding Up Three-Dimensional Filter Process>, the smooth processing unit 255 performs the three-dimensional smooth filter process on a point of the geometry point cloud in the processing target region, using the representative value of each local region as a reference value. Accordingly, the smooth processing unit 255 can perform the three-dimensional smooth filter process at a higher speed.

Figure 27:
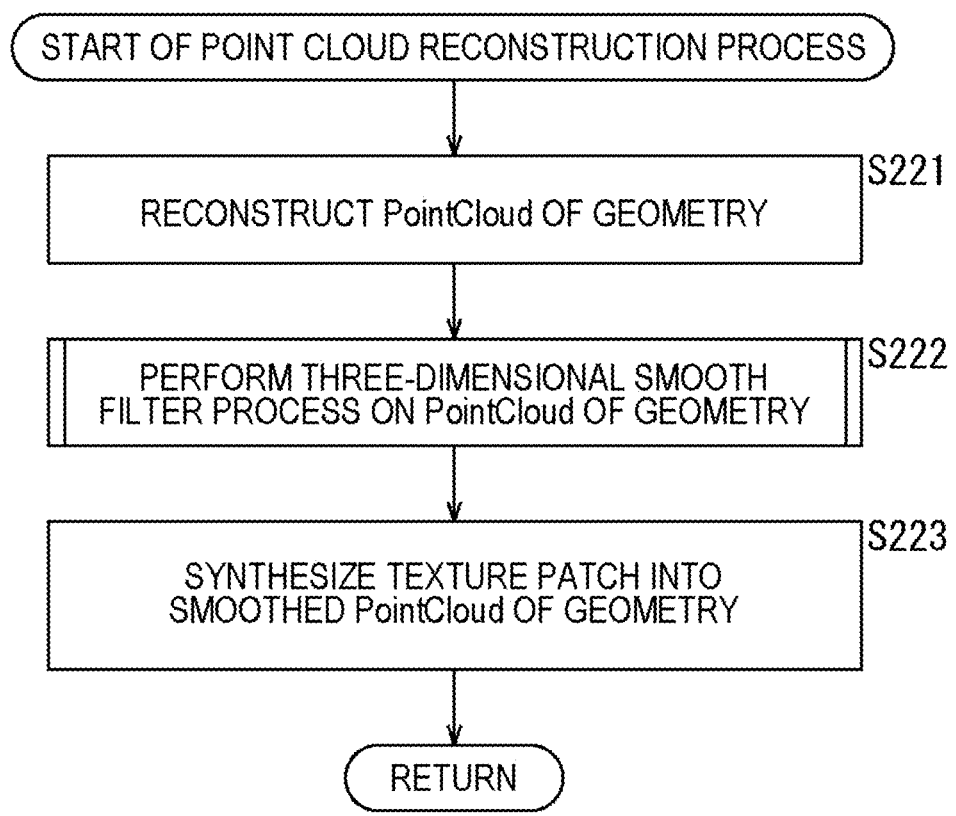
FIG. 27 is a flowchart explaining an example of the flow of a point cloud reconstruction process.
Figure 28:
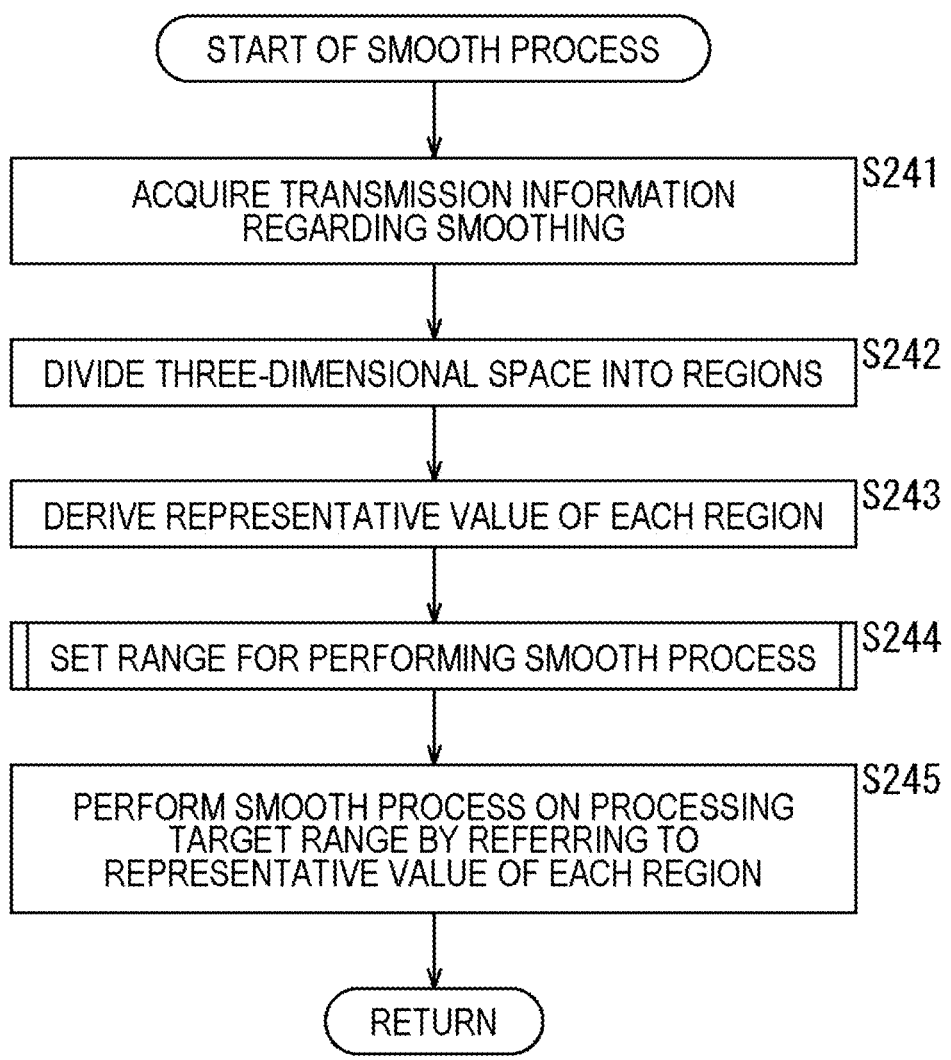
FIG. 28 is a flowchart explaining an example of the flow of a smooth process.

Once the process in step S245 ends, the smooth process ends and the process returns to FIG. 27.

By executing each process as described above, an increase in the processing time of the filter process for the point cloud data can be suppressed (the filter process can be performed at a higher speed).

4. Variations

In the first and the second embodiments, it has been described that the three-dimensional smooth filter process is performed on the position information on the point cloud, but the three-dimensional smooth filter process can also be performed on the attribute information on the point cloud. In this case, since the attribute information is smoothed, for example, the color and the like of the point changes.

For example, in the case of the encoding apparatus 100, a smooth processing unit (for example, a three-dimensional attribute information smooth processing unit) that performs the smooth process on the texture patch supplied to the texture correction unit 134 only needs to be provided in the patch decomposition unit 111 (FIG. 17).

Furthermore, for example, in the case of the decoding apparatus 200, a smooth processing unit (for example, a three-dimensional attribute information smooth processing unit) that performs the smooth process on the texture patch supplied to the texture synthesis unit 233 only needs to be provided in the 3D reconstruction unit 217 (FIG. 24).

5. Supplementary Notes>

<Control Information>

The control information relating to the present technology described in each of the above embodiments may be transmitted from the encoding side to the decoding side. For example, control information (for example, enabled_flag) that controls whether or not the application of the present technology described above is permitted (or prohibited) may be transmitted. Furthermore, for example, control information that designates a range in which the application of the present technology described above is permitted (or prohibited) (for example, an upper limit or a lower limit of the block size, or both of the upper limit and the lower limit, a slice, a picture, a sequence, a component, a view, a layer, and the like) may be transmitted.

<Computer>

A series of the above-described processes can be executed by using hardware as well and also can be executed by using software. When the series of the processes is executed by software, a program constituting the software is installed in a computer. Here, the computer includes a computer built into dedicated hardware and a computer capable of executing various functions when installed with various programs, for example, a general-purpose personal computer or the like.

Figure 29:
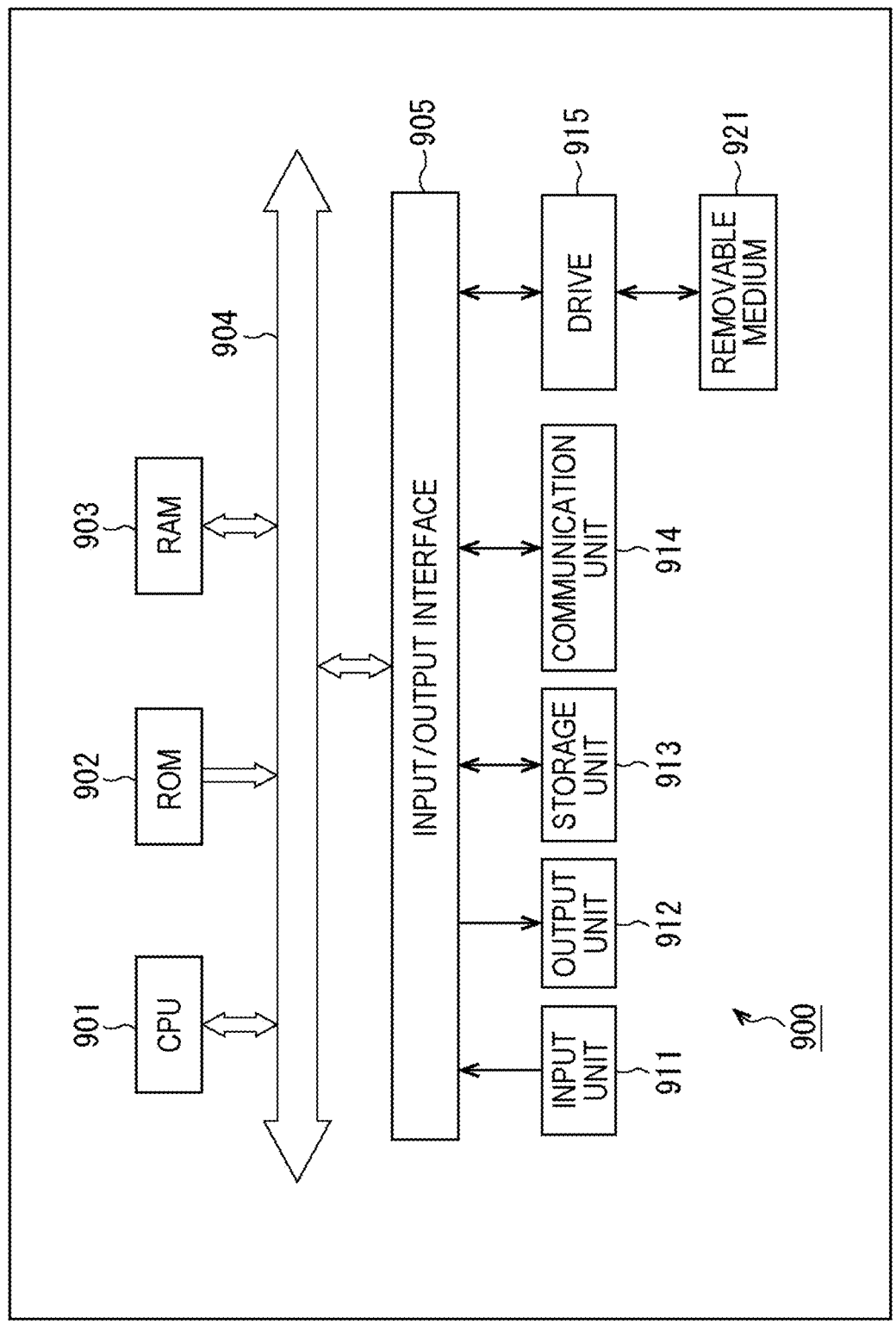
FIG. 29 is a block diagram illustrating a main configuration example of a computer.

FIG. 29 is a block diagram illustrating a hardware configuration example of a computer that executes the above-described series of the processes using a program.

In a computer 900 illustrated in FIG. 29, a central processing unit (CPU) 901, a read only memory (ROM) 902, and a random access memory (RAM) 903 are interconnected via a bus 904.

Furthermore, an input/output interface 910 is also connected to the bus 904. An input unit 911, an output unit 912, a storage unit 913, a communication unit 914, and a drive 915 are connected to the input/output interface 910.

For example, the input unit 911 includes a keyboard, a mouse, a microphone, a touch panel, an input terminal, and the like. For example, the output unit 912 includes a display, a speaker, an output terminal, and the like. For example, the storage unit 913 includes a hard disk, a RAM disk, a non-volatile memory, and the like. For example, the communication unit 914 includes a network interface. The drive 915 drives a removable medium 921 such as a magnetic disk, an optical disc, a magneto-optical disk, or a semiconductor memory.

In the computer configured as described above, for example, the above-described series of the processes is performed in such a manner that the CPU 901 loads a program stored in the storage unit 913 into the RAM 903 via the input/output interface 910 and the bus 904 to execute. Data required by the CPU 901 when executing the various processes, and the like are also stored in the RAM 903 as appropriate.

For example, the program executed by the computer (CPU 901) can be applied by being recorded in the removable medium 921 serving as a package medium or the like. In that case, the program can be installed to the storage unit 913 via the input/output interface 910 by mounting the removable medium 921 in the drive 915.

Furthermore, this program can also be provided via a wired or wireless transmission medium such as a local area network, the Internet, or digital satellite broadcasting. In that case, the program can be received by the communication unit 914 to be installed to the storage unit 913.

As an alternative manner, this program also can be installed to the ROM 902 or the storage unit 913 in advance.

<Application Target of Present Technology>

In the above, the case of applying the present technology to the encoding and decoding of point cloud data has been described, but the present technology is not limited to these examples, and can be applied to the encoding and decoding of 3D data of any standard. In other words, as long as there is no inconsistency with the present technology described above, specifications of various processes such as encoding and decoding techniques and various kinds of data such as 3D data and metadata are optional. Furthermore, some of the above-mentioned processes and specifications may be omitted as long as there is no inconsistency with the present technology.

The present technology can be applied to any configuration. For example, the present technology can be applied to a variety of kinds of electronic equipment such as a transmitter and a receiver (for example, a television receiver and a mobile phone) for satellite broadcasting, cable broadcasting such as cable television, distribution on the Internet, distribution to a terminal by cellular communication, and the like, or apparatuses (for example, a hard disk recorder and a camera) that record images on media such as an optical disc, magnetic disk, and flash memory, and reproduce images from these storage media.

Furthermore, for example, the present technology can also be carried out as a partial configuration of an apparatus, such as a processor serving as system large scale integration (LSI) or the like (for example, a video processor), a module using a plurality of processors or the like (for example, a video module), a unit using a plurality of modules or the like (for example, a video unit), or a set in which another function is further added to a unit, or the like (for example, a video set).

In addition, for example, the present technology can also be applied to a network system constituted by a plurality of apparatuses. For example, the present technology may be carried out as cloud computing in which processes are shared and performed in coordination by a plurality of apparatuses via a network. For example, the present technology may be carried out in a cloud service that provides services relating to images (moving images) to any terminals such as computers, audio visual (AV) equipment, portable information processing terminals, and Internet of Things (IoT) devices.

Note that, in the present description, the system refers to a collection of a plurality of constituent members (e.g., apparatuses and modules (components)), and whether or not all the constituent members are arranged within the same cabinet is not regarded as important. Accordingly, a plurality of apparatuses accommodated in separate cabinets so as to be connected to one another via a network and one apparatus of which a plurality of modules is accommodated within one cabinet are both deemed as systems.

<Fields and Use Purposes to which Present Technology can be Applied>

A system, apparatus, processing unit, and the like to which the present technology is applied can be utilized in any fields such as traffic, medical care, crime prevention, agriculture, livestock industry, mining, beauty, factory, household appliance, meteorology, and natural surveillance, for example. Furthermore, the use purposes of the above system and the like are also optional.

<Others>

Note that, in the present description, the "flag" refers to information for identifying between a plurality of states, and includes not only information used when identifying between two states of true (1) and false (0), but also information capable of identifying between three or more states. Accordingly, the value that this "flag" can take may be, for example, a binary value of 1 or 0, or a ternary or more value. That is, the number of bits constituting this "flag" is optional, and one bit or a plurality of bits may be employed. Furthermore, identification information (including the flag) is supposed to have not only a form in which the identification information is included in the bitstream but also a form in which the difference information of the identification information with respect to certain reference information is included in the bitstream. Therefore, in the present description, the "flag" and "identification information" imply not only the whole information therein but also the difference information with respect to reference information.

In addition, various pieces of information (metadata and the like) regarding the coded data (bitstream) may be transmitted or recorded in any form as long as the information is associated with the coded data. Here, the term "associate" means, for example, to ensure that one piece of data is available (linkable) when another piece of data is processed. In other words, pieces of data associated with each other may be collected into one piece of data or may be separately treated as individual pieces of data. For example, information associated with the coded data (image) may be transmitted on a transmission path different from the transmission path of the associated coded data (image). Furthermore, for example, information associated with the coded data (image) may be recorded on a recording medium (or a recording area of the same recording medium) different from the recording medium of the associated coded data (image). Note that this "association" may be made on a part of the data, instead of the entire data. For example, an image and information corresponding to this image may be associated with each other in any units such as a plurality of frames, one frame, or a part of the frame.

In addition, in the present description, terms such as "synthesize", "multiplex", "add", "integrate", "include", "save", "incorporate", "put into", "insert" mean collecting a plurality of objects into one, such as collecting coded data and metadata into one piece of data, for example, and mean one method of "associate" described above.

Furthermore, the embodiments according to the present technology are not limited to the aforementioned embodiments and a variety of modifications can be made without departing from the scope of the present technology.

For example, a configuration described as one apparatus (or a processing unit) may be divided so as to be configured as a plurality of apparatuses (or processing units). Conversely, a configuration described as a plurality of apparatuses (or processing units) in the above may be collected so as to be configured as one apparatus (or one processing unit). Furthermore, as a matter of course, a configuration other than those described above may be added to the configurations of the respective apparatuses (or the respective processing units). Moreover, a part of the configuration of a certain apparatus (or a certain processing unit) may be included in the configuration of another apparatus (or another processing unit) as long as the configuration or the action of the system as a whole is maintained substantially unchanged.

In addition, for example, the above-described program may be executed by any apparatus. In that case, that apparatus is only required to have necessary functions (function blocks or the like) such that necessary information can be obtained.

Furthermore, for example, one apparatus may execute each step of one flowchart, or a plurality of apparatuses may share and execute the steps. Moreover, when a plurality of processes is included in one step, the plurality of processes may be executed by a single apparatus, or may be shared and executed by a plurality of apparatuses. In different terms, a plurality of processes included in one step can also be executed as processes in a plurality of steps. Conversely, the processes described as a plurality of steps can also be collected into one step to be executed.

In addition, for example, the program executed by the computer may be designed in such a manner that the processes of steps describing the program are executed along the time series in accordance with the order described in the present description, or executed in parallel or individually at a necessary timing, for example, when called. In other words, as long as there is no inconsistency, the processes of the respective steps may be executed in an order different from the order described above. Moreover, these processes of the steps describing the program may be executed in parallel with a process of another program, or may be executed in combination with a process of another program.

Furthermore, for example, as long as there is no inconsistency, each of a plurality of technologies relating to the present technology can be independently carried out alone. As a matter of course, it is also possible to carry out any plurality of the present technologies at the same time. For example, a part or the whole of the present technology described in any of the embodiments can be carried out in combination with a part or the whole of the present technology described in another embodiment. In addition, a part or the whole of any one of the present technologies described above can be carried out with another technology not mentioned above at the same time.

REFERENCE SIGNS LIST

100 Encoding apparatus
111 Patch decomposition unit
112 Packing unit
113 OMap generation unit
114 Auxiliary patch information compression unit
115 Video encoding unit
116 Video encoding unit
117 OMap encoding unit
118 Multiplexer
131 Patch decomposition processing unit
132 Geometry decoding unit
133 Three-dimensional position information smooth processing unit
134 Texture correction unit
141 Region division unit
142 In-region representative value derivation unit
143 Processing target region setting unit
144 Smooth processing unit
145 Transmission information generation unit
200 Decoding apparatus
211 Demultiplexer
212 Auxiliary patch information decoding unit
213 Video decoding unit
214 Video decoding unit
215 OMap decoding unit
216 Unpacking unit
217 3D reconstruction unit
231 Geometry point cloud generation unit
232 Three-dimensional position information smooth processing unit
233 Texture synthesis unit
251 Transmission information acquisition unit
252 Region division unit
253 In-region representative value derivation unit
254 Processing target region setting unit
255 Smooth processing unit

What is claimed is:
1. An image processing apparatus comprising:
circuitry configured to:
divide a three-dimensional space containing point cloud data into a plurality of grids;

derive, for the grids, respective representative values of the point cloud data;

perform a filter process on the point cloud data by performing trilinear smoothing of the respective representative values of the grid; and encode a two-dimensional plane image on which the point cloud data subjected to the filter process, and generate a bitstream related to the encoded two-dimensional plane image.

2. The image processing apparatus according to claim 1, wherein the grids each have a cube shape having a predetermined size.

3. The image processing apparatus according to claim 1, wherein the grids each have a rectangular parallelepiped shape having a predetermined size.

4. The image processing apparatus according to claim 1, wherein the circuitry is configured to generate the bitstream including information regarding at least one of a size or a shape of each grid.

5. The image processing apparatus according to claim 1, wherein each of the respective representative values includes an average of the point cloud data contained in a corresponding one of the grids.

6. The image processing apparatus according to claim 1, wherein each of the respective representative values includes a median of the point cloud data contained in a corresponding one of the grids.

7. The image processing apparatus according to claim 1, wherein the circuitry is configured to perform the trilinear smoothing on geometry information on points of the point cloud data.

8. The image processing apparatus according to claim 1, wherein the circuitry is configured to perform the trilinear smoothing on attribute information on points of the point cloud data.

9. The image processing apparatus according to claim 1, wherein the circuitry performs the filter process on a point of the point cloud data corresponding to an end portion of a patch included in the two-dimensional plane image.

10. An image processing method performed by an electronic device, the method comprising:

dividing a three-dimensional space containing point cloud data into a plurality of grids;

deriving, for the grids, respective representative values of the point cloud data;

performing a filter process on the point cloud data by performing trilinear smoothing of the respective representative values of the grid; and encoding a two-dimensional plane image on which the point cloud data subjected to the filter process, and generate a bitstream related to the encoded two-dimensional plane image.

11. An image processing apparatus comprising:

circuitry configured to: therefor decode a bitstream and generate coded data of a two-dimensional plane image on which point cloud data is projected;

reconstruct the point cloud data from the two-dimensional plane image;

divide three-dimensional space containing the reconstructed point cloud data into a plurality of grids;

derive, for the grids, respective representative values of the reconstructed point cloud data; and perform a filter process on the reconstructed point cloud data by performing trilinear smoothing of the respective representative values of the grids.

12. An image processing method performed by an electronic device, the method comprising:

decoding a bitstream and generate coded data of a two-dimensional plane image on which point cloud data is projected;

reconstructing the point cloud data from the two-dimensional plane image;

dividing three-dimensional space containing the reconstructed point cloud data into a plurality of grids;

deriving, for the grids, respective representative values of the reconstructed point cloud data; and performing a filter process on the reconstructed point cloud data by performing trilinear smoothing of the respective representative values of the grids.

* * * * *